(12) United States Patent
Kyou

(10) Patent No.: US 10,686,915 B2
(45) Date of Patent: Jun. 16, 2020

(54) COMMUNICATION DEVICE, COMMUNICATION METHOD, AND STORAGE MEDIUM

(71) Applicant: CASIO COMPUTER CO., LTD., Shibuya-ku, Tokyo (JP)

(72) Inventor: Kazuho Kyou, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 32 days.

(21) Appl. No.: 15/912,758

(22) Filed: Mar. 6, 2018

(65) Prior Publication Data

US 2018/0278726 A1 Sep. 27, 2018

(30) Foreign Application Priority Data

Mar. 27, 2017 (JP) .................. 2017-061025

(51) Int. Cl.
H04L 29/06 (2006.01)
H04W 4/80 (2018.01)
H04L 12/28 (2006.01)

(52) U.S. Cl.
CPC ............ H04L 69/22 (2013.01); H04W 4/80 (2018.02); *H04L 12/2816* (2013.01); *H04L 29/0653* (2013.01)

(58) Field of Classification Search
CPC ... H04W 4/80; Y02D 70/144; H04L 12/2816; H04L 69/22; H04L 49/9042; H04L 29/0653; H04L 12/2809; H04L 12/2807; H04L 12/281
See application file for complete search history.

(56) References Cited

U.S. PATENT DOCUMENTS

| | | | | |
|---|---|---|---|---|
| 7,856,530 B1* | 12/2010 | Mu | ............... | G06F 12/0888 711/119 |
| 2016/0164693 A1* | 6/2016 | Choi | ............... | H04L 12/2809 370/474 |
| 2016/0321054 A1 | 11/2016 | Hillyard | | |
| 2017/0046503 A1* | 2/2017 | Cho | ............... | G09B 5/02 |
| 2017/0048655 A1 | 2/2017 | Kwon et al. | | |

FOREIGN PATENT DOCUMENTS

JP 2009-143005 7/2009

OTHER PUBLICATIONS

Extended European Search Report for European Patent Application No. 18162891.8 dated Jun. 18, 2018.

* cited by examiner

*Primary Examiner* — Kevin C. Harper
(74) *Attorney, Agent, or Firm* — Amin, Turocy & Watson, LLP

(57) ABSTRACT

According to an aspect of the present invention, a device includes a transmitter and receiver that transmits and receives communication packets to and from other device, a memory that stores one or more reference information which present a function for data request and a function for data communication which a service comprises, one or more predetermined data relating to the functions, and one or more distinguishing information for distinguishing the predetermined data, and a processor. The processor generates a packet which includes the reference information associated with the function for data communication, the predetermined data, and the distinguishing information.

9 Claims, 23 Drawing Sheets

| Handle | Attribute Type |
|---|---|
| 0x0010 | <<Primary Service>> |
| 0x0011 | <<Characteristic>> |
| 0x0012 | <<Characteristic for data request>> |
| 0x0013 | <<Characteristic>> |
| 0x0014 | <<Characteristic for data communication>> |
| 0x0015 | <<CCCD>> |

| 2 Octets | 2 or 16 Octets | variable length | |
|---|---|---|---|
| Attribute Handle | Attribute Type | Attribute Value | Attribute Permission |

FIG. 5

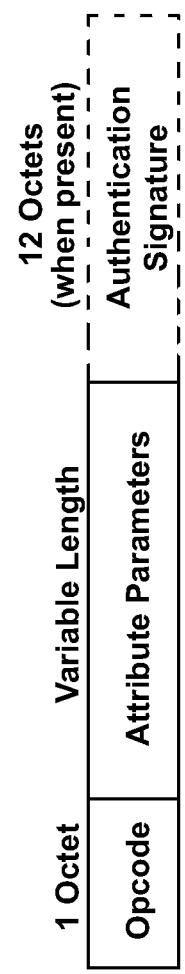

| Attribute PDU Name | Attribute Opcode | Parameters |
|---|---|---|
| Error Response | 0x01 | Request Opcode in Error, Attribute Handle In Error, Error Code |
| Exchange MTU Request | 0x02 | Client Rx MTU |
| Exchange MTU Response | 0x03 | Server Rx MTU |
| Find Information Request | 0x04 | Starting Handle, Ending Handle, UUID |
| Find Information Response | 0x05 | Format, Information Data |
| Find By Type Value Request | 0x06 | Starting Handle, Ending Handle, Attribute Type, Attribute Value |
| Find By Type Value Response | 0x07 | Handles Information List |
| Read By Type Request | 0x08 | Starting Handle, Ending Handle, UUID |
| Read By Type Response | 0x09 | Length, Attribute Data List |
| Read Request | 0x0A | Attribute Handle |
| Read Response | 0x0B | Attribute Value |
| Read Blob Request | 0x0C | Attribute Handle, Value Offset |
| Read Blob Response | 0x0D | Part Attribute Value |
| Read Multiple Request | 0x0E | Handle Set |
| Read Multiple Response | 0x0F | Value Set |
| Read by Group Type Request | 0x10 | Start Handle, Ending Handle, UUID |
| Read by Group Type Response | 0x11 | Length, Attribute Data List |
| Write Request | 0x12 | Attribute Handle, Attribute Value |
| Write Response | 0x13 | — |
| Write Command | 0x52 | Attribute Handle, Attribute Value |
| Prepare Write Request | 0x16 | Attribute Handle, Value Offset, Part Attribute Value |
| Prepare Write Response | 0x17 | Attribute Handle, Value Offset, Part Attribute Value |
| Execute Write Request | 0x18 | Flags |
| Execute Write Response | 0x19 | - |
| Handle Value Notification | 0x1B | Attribute Handle, Attribute Value |
| Handle Value Indication | 0x1D | Attribute Handle, Attribute Value |
| Handle Value Confirmation | 0x1E | |
| Signed Write Command | 0xD2 | Attribute Handle, Attribute Value, Authentication Signature |

FIG. 7

| Handle | Attribute Type |
|---|---|
| 0x0010 | <<Primary Service>> |
| 0x0011 | <<Characteristic>> |
| 0x0012 | <<ServiceN1>> |
| 0x0013 | <<Characteristic>> |
| 0x0014 | <<ServiceN2>> |
| 0x0015 | <<CCCD>> |
| 0x0016 | <<Characteristic>> |
| 0x0017 | <<ServiceN3>> |
| ⋮ | ⋮ |
| 0x0030 | <<Characteristic>> |
| 0x0031 | <<ServiceNx>> |
| 0x0032 | <<CCCD>> |

FIG. 8

| Handle | Attribute Type |
|---|---|
| 0x0010 | <<Primary Service>> |
| 0x0011 | <<Characteristic>> |
| 0x0012 | <<Characteristic for data request>> |
| 0x0013 | <<Characteristic>> |
| 0x0014 | <<Characteristic for data communication>> |
| 0x0015 | <<CCCD>> |

FIG. 9

| Embodiment | 1st Device | 2nd Device | Implemented Characteristic | Distinguishing Method | Feature |
|---|---|---|---|---|---|
| 1st Embodiment | Server | Client | Char for Data Req in 1st device<br>Char for Data Comm in 1st device | Distinguishing Info | A degree of freedom is high in the communication order because data request can be performed as needed. |
| 2nd Embodiment | Server | Client | Char for Data Comm in 1st device | Distinguishing Info | A service consists of one characteristic. |
| 3rd Embodiment | Server/Client | Server/Client | Char for Data Comm in 1st device<br>Char for Data Req in 2nd device | Distinguishing Info | A degree of freedom is high in the communication order because data request can be performed as needed. Service discovery is performed mutually between the two devices. |
| 4th Embodiment | Server/Client | Server/Client | Char for Data Comm in 1st device<br>Char for Data Comm in 2nd device | Distinguishing Info+Flag | A degree of freedom is high in the communication order because data request can be performed as needed. Service discovery is performed mutually between the two devices. |
| 5th Embodiment | Server/Client | Server/Client | Char for Data Comm in 1st device<br>Char for Data Comm in 2nd device | Distinguishing Info+w/ or w/t valid data | A degree of freedom is high in the communication order because data request can be performed as needed. Service discovery is performed mutually between the two devices. |
| 6th Embodiment | Server | Client | Char for Data Comm in 1st device | Distinguishing Info+Flag | A degree of freedom is high in the communication order because data request can be performed as needed. |
| 7th Embodiment | Server | Client | Char for Data Comm in 1st device | Distinguishing Info+w/ or w/t valid data | A degree of freedom is high in the communication order because data request can be performed as needed. |

FIG. 23

COMMUNICATION DEVICE, COMMUNICATION METHOD, AND STORAGE MEDIUM

CROSS-REFERENCE TO RELATED APPLICATIONS

This application is based upon and claims the benefit of priority under 35 USC 119 of Japanese Patent Application No. 2017-061025 filed on Mar. 27, 2017, the entire disclosure of which is incorporated herein by reference in its entirety for all purposes.

BACKGROUND OF THE INVENTION

1. Field of the Invention

The present invention relates to a communication device, a communication method, and a computer readable storage medium for storing a program for executing the communication method therein.

2. Description of the Related Art

Conventionally, there exist electronic devices capable of exchanging various kinds of information with other devices using a short-distance wireless communication protocol such as Bluetooth (Registered Trademark). Bluetooth is a communication standard for connecting various devices and exchanging data between the devices wirelessly over short distances. There are two types of Bluetooth communication technologies: BR/EDR (Basic Rate/Enhanced Data Rate) and LE (Low Energy). Bluetooth Low Energy (hereinafter, referred to as "BLE") adopted in Bluetooth 4.0 and later versions is a technology enabling several hundreds of kilobytes (KBs) of information to be stably communicated with low power consumption.

A Bluetooth device can perform wireless communication through a process of detecting/selecting/authenticating (pairing) neighboring Bluetooth devices. The Bluetooth specification includes the generic attribute profile (GATT) and the GATT includes the service discovery protocol (SDP) which helps finding available services for applications executed in the Bluetooth device and discovering characteristics of the services. Generally, the characteristic is a single data array included in a service and the characteristic value indicates a setting value of a specific function. The service is configured to have one characteristic for one function. Thus, the number of characteristics included in one service is the same as the number of kinds of setting values provided by the service. Information on the SDP is included in the Bluetooth Service Discovery Profile. The SDP is a protocol for exchanging information on available services in a connected Bluetooth device and features of the available services. For example, using the service discovery protocol, Bluetooth devices installed in various digital apparatuses exchange information on whether or not a service such as a LAN Access Point, a mobile phone, a facsimile, or a printer is provided. Further, the SDP has a server-client structure. A server device holds a list of available services and details of each service as a database. A client can request information relating to a service from the server to obtain the information.

For example, Japanese Patent Application Laid-Open Publication No. 2009-143005 published on Jul. 2, 2009, discloses detecting communication devices by a detection scheme specified by the Service Discovery Profile.

According to the technology disclosed in the above patent document, a connection procedure between devices takes a long time due to search of devices and services, and the power consumption in the network is large.

SUMMARY OF THE INVENTION

The present specification discloses methods for improving a process of connection between wireless communication devices, communication devices for executing the methods, and computer readable storage mediums for storing programs capable of executing the methods therein.

According to one aspect of the invention, a device includes a transmitter and receiver that transmits and receives communication packets to and from other device, a memory that stores one or more reference information which present a function for data request and a function for data communication which a service comprises, one or more predetermined data relating to the functions, and one or more distinguishing information for distinguishing the predetermined data, and a processor. The processor generates a packet which includes the reference information associated with the function for data communication, the predetermined data, and the distinguishing information.

According to another aspect of the invention, a device includes a transmitter and receiver that transmits and receives communication packets to and from other device, and receives one or more reference information associated with one or more functions, a memory that stores one or more distinguishing information, and a processor. The processor generates a packet which includes a reference information of a first function and a first distinguishing information corresponding to a predetermined data relating to the first function.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are intended exclusively for explanation and do not limit the scope of the present invention.

Here:

FIG. 5 shows an example of a typical structure of an Attribute stored in a GATT server.

FIG. 6A shows a packet structure defined by the BLE protocol.

FIG. 6B shows an example of a structure of an Attribute Protocol PDU which can be used to communicate an attribute value.

FIG. 7 is a table showing an example of a list of Attribute Opcodes and parameters of Attribute Protocol PDUs.

FIG. 8 shows an example of a service structure of a BLE device.

FIG. 9 shows an example of the service structure.

FIG. 23 is a table summarizing configurations and features of embodiments of the present invention.

DETAILED DESCRIPTION OF THE PREFERRED EMBODIMENT

In the present specification, the invention will be mainly described in connection with embodiments in which it has been applied to Bluetooth, in particular BLE, but its application field is not limited to Bluetooth. For example, the invention can be applied to different communication systems using the concept of services and characteristics.

Hereinafter, embodiments of the present invention will be described with reference to the accompanying drawings. The scope of the invention is not intended to be limited to the illustrated examples.

Figure 1:
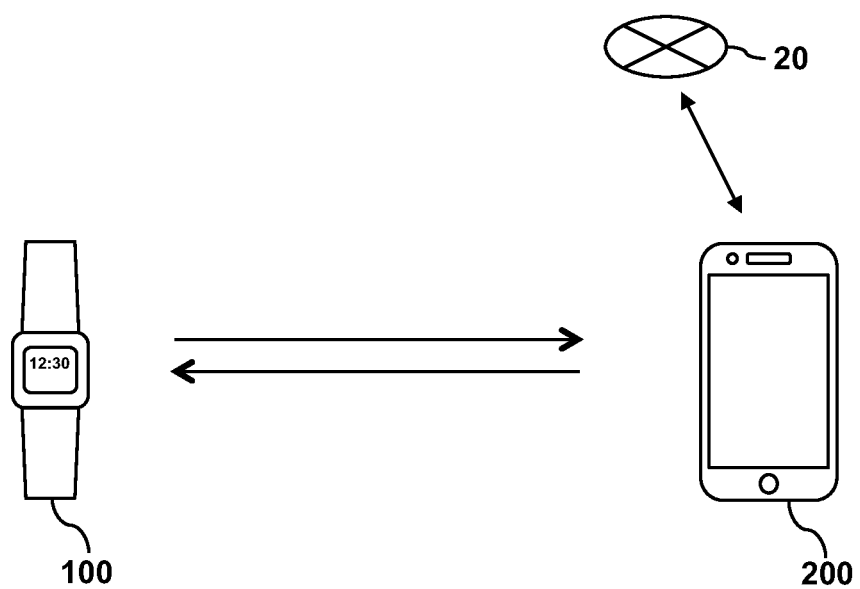
FIG. 1 shows an example of a wireless communication system to which methods proposed in this disclosure are applicable.

FIG. 1 is common to all of the embodiments in the following and shows an example of a wireless communication system to which methods proposed in this disclosure are applicable. In the embodiments described below, a first device and a second device perform short-distance wireless communication using the BLE technology. A wireless communication system 10 includes at least a first device 100 and a second device 200 capable of being wirelessly connected to and exchanging data with the first device 100 via BLE. For example, the first device 100 to which the present invention is applicable is an electronic timepiece which is a kind of a watch type terminal. However, the first device 100 is not limited to this example and any type or any kind of device capable of BLE communication can be the first device 100. For example, the first device 100 may be a digital camera, a healthcare appliance such as a digital body weight scale, or a wearable device such as a smart band.

The second device 200 is, for example, a smart phone which is a kind of a mobile phone and is connected to a mobile communication network 20. However, the second device 200 is not limited to this example and any type or any kind of device capable of short distance wireless communication can be the second device 200.

As will be described in detail in the following, Attribute Protocol (ATT) of BLE defines rules for one device to access data of the other device in the server-client structure. A server provides a service and a client can acquire information relating to the service provided by the server by sending a request to the server. Hereinafter, for convenience of explanation, the first device 100 is regarded as the server and an application of the second device 200 is regarded as the client, unless otherwise specified. However, the first device 100 may operate as the client in relation to device(s) other than the second device 200 and the second device 200 may operate as the server in relation to device(s) other than the first device 100. In a BLE communication system, one device belonging to the system may operate as the server or the client or as the client and server at the same time.

The second device 200 can request data from the first device 100. In the case that the first device 100 receives a Request message for requesting data from the second device 200, the first device 100 provides the second device 200 with the requested data by a Response message. Further, the first device 100 transmits a Notification message or an Indication message to send data to the second device 200. In the case that the first device 100 transmits the Indication message to the second device 200 and the Indication message is successfully received by the second device 200, the second device 200 transmits a Confirmation message to the first device 100 in response to the Indication message. In addition, the second device 200 transmits a Request message or a Command message to the first device 100 to make a request to the first device 100 for data writing. In the case that the second device 200 transmits the Request message to the first device 100 and the data is successfully written by the first device 100, the first device 100 transmits a Response message to the second device 200.

The first device 100 or the second device 200 can provide a user with information data via an output unit (for example, a display) or receive a request of the user input via an input unit (for example, a user input interface) during communicating a message with the other device. Further, the first device 100 or the second device 200 can read data from a memory or write new data to the memory.

Figure 2A:
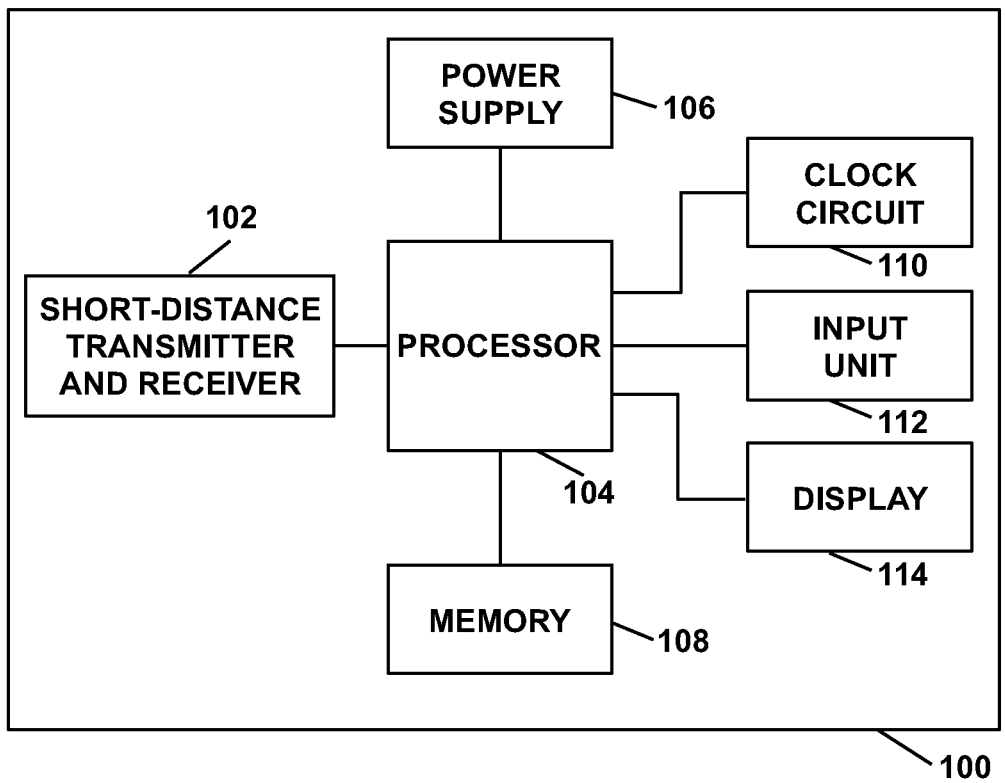
FIG. 2A is an internal block diagram illustrating an exemplary device capable of implementing the methods proposed in this disclosure.
Figure 2B:
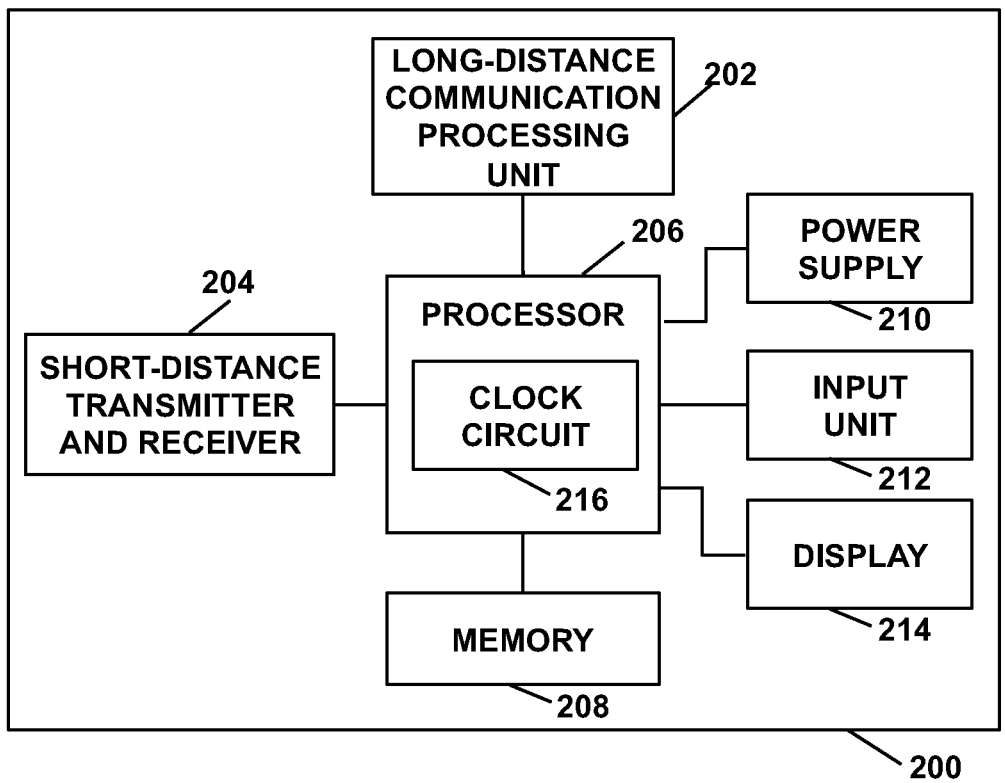
FIG. 2B is an internal block diagram illustrating an exemplary device capable of implementing the methods proposed in this disclosure.

Each of FIGS. 2A and 2B is an internal block diagram illustrating an exemplary device capable of implementing the methods proposed in this disclosure. FIG. 2A is an internal block diagram of the first device 100 and FIG. 2B is an internal block diagram of the second device 200.

As shown in FIG. 2A, the first device 100 includes a short-distance transmitter and receiver 102, a processor 104, a power supply 106, a memory 108, a clock circuit 110, an input unit 112, and a display 114. The short-distance transmitter and receiver 102 includes an interface enabling transmission/reception of the Request/Response, Command, Notification, Indication/Confirmation messages or data between the devices using the short-distance wireless communication technology (for example, Bluetooth) and a baseband circuit for processing wireless signals. In the present embodiment, the short-distance transmitter and receiver 102 supports BLE. At least one of functions of the short-distance transmitter and receiver 102 can be implemented by software. In this case, the software implementing the at least one function can be stored in the memory 108 in the form of a program executing the at least one function.

The processor 104 controls operations of the first device 100 and may also be referred to as a control unit, or a controller. The processor 104 may include an ASIC (application-specific integrated circuit), different chipsets, a logic circuit and/or a data processing unit. The power supply 106 includes a battery and a power management unit (not shown in the drawing). The memory 108 is used to store computer program instructions executed by the processor 104, software such as firmware, data required by the processor 104, and/or data resulted from processing by the processor 104. The memory 108 includes one or more storage devices selected from a group including a RAM (Random Access Memory), a ROM (Read Only Memory), a flash memory, and a disk drive integrated into or removable from the first device 100. Alternatively, the memory 108 may be integrated into the processor 104.

The clock circuit 110 includes a counter for generating time signals, for example, from signals generated by a system clock or an oscillator (not shown in the drawing). The clock circuit 110 generates time information by counting current date and time and outputs the generated time information to the processor 104. The clock circuit 110 may be integrated into the processor 104. The input unit 112 includes one or more keys, one or more switches, and/or a touch panel (not shown in the drawing). Various kinds of data are input according to manipulations of the input unit 112 by the user. The display 114 includes a display device such as an LCD or an OLED and a driving circuit (not shown in the drawing) and displays information such as the current time.

The first device 100 normally displays the current time, which is being counted by the clock circuit 110, using the display 114. In the case that the first device 100 receives data indicating current time from the second device 200 via the short-distance transmitter and receiver 102, time of the first device 100 is synchronized with that of the second device 200 by setting the clock circuit 110 to the time indicated by the received data.

As shown in FIG. 2B, the second device 200 includes a long-distance communication processing unit 202, a short-distance transmitter and receiver 204, a processor 206, a memory 208, a power supply 210, an input unit 212, and a display 214. The processor 206 includes a clock circuit 216. The long-distance communication processing unit 202 allows the second device 200 to serve as a mobile phone by communicating with a base station of a cellular network system such as 3G or LTE. The long-distance communication processing unit 202 includes an amplifier for amplifying signals received or transmitted via an antenna, a transceiver, a digital baseband processor, a voice input circuit, or a playback circuit, but descriptions and drawings of these components are omitted because they are well-known. The clock circuit 216 can hold accurate time information by acquiring accurate time data via the long-distance communication processing unit 202 from the mobile communication network 20. As described above, the second device 200 can transfer the time information held by the clock circuit 216 to the first device 100.

The short-distance transmitter and receiver 204 includes an interface enabling transmission/reception of the Request/Response, Command, Notification, Indication/Confirmation messages or data between the devices using the short-distance wireless communication technology (for example, Bluetooth) and a baseband circuit for processing radio signals. In the present embodiment, the short-distance transmitter and receiver 204 supports BLE. At least one of functions of the short distance communicator 204 can be implemented by software. In this case, the software implementing the at least one function can be stored in the memory 208 in the form of a program executing the at least one function.

The processor 206 controls operations of the second device 200 and is an application processor, for example. While the processor 206 includes the clock circuit 216 in the present embodiment, the clock circuit 216 may be a separate element in different embodiments. The memory 208 is used to store computer program instructions executed by the processor 206, software such as firmware, data required by the processor 206, and/or data resulted from processing by the processor 206. The memory 208 includes one or more storage devices selected from a group including a RAM (Random Access Memory), a ROM (Read Only Memory), a flash memory, and a disk drive integrated into or removable from the second device 200. Alternatively, the memory 208 may be integrated into the processor 206.

The power supply 210 includes a battery and a power management unit (not shown in the drawing). The input unit 212 includes one or more keys, one or more switches, and/or a touch panel (not shown in the drawing). Various kinds of data are input according to manipulations of the input unit 212 by the user. The display 214 includes a display device such as an LCD or an OLED and a driving circuit (not shown in the drawing).

The system shown in FIG. 1, and the devices shown in FIGS. 2A and 2B, respectively, are merely examples and do not limit the scope of systems or devices capable of implementing the methods described herein.

Figure 3:
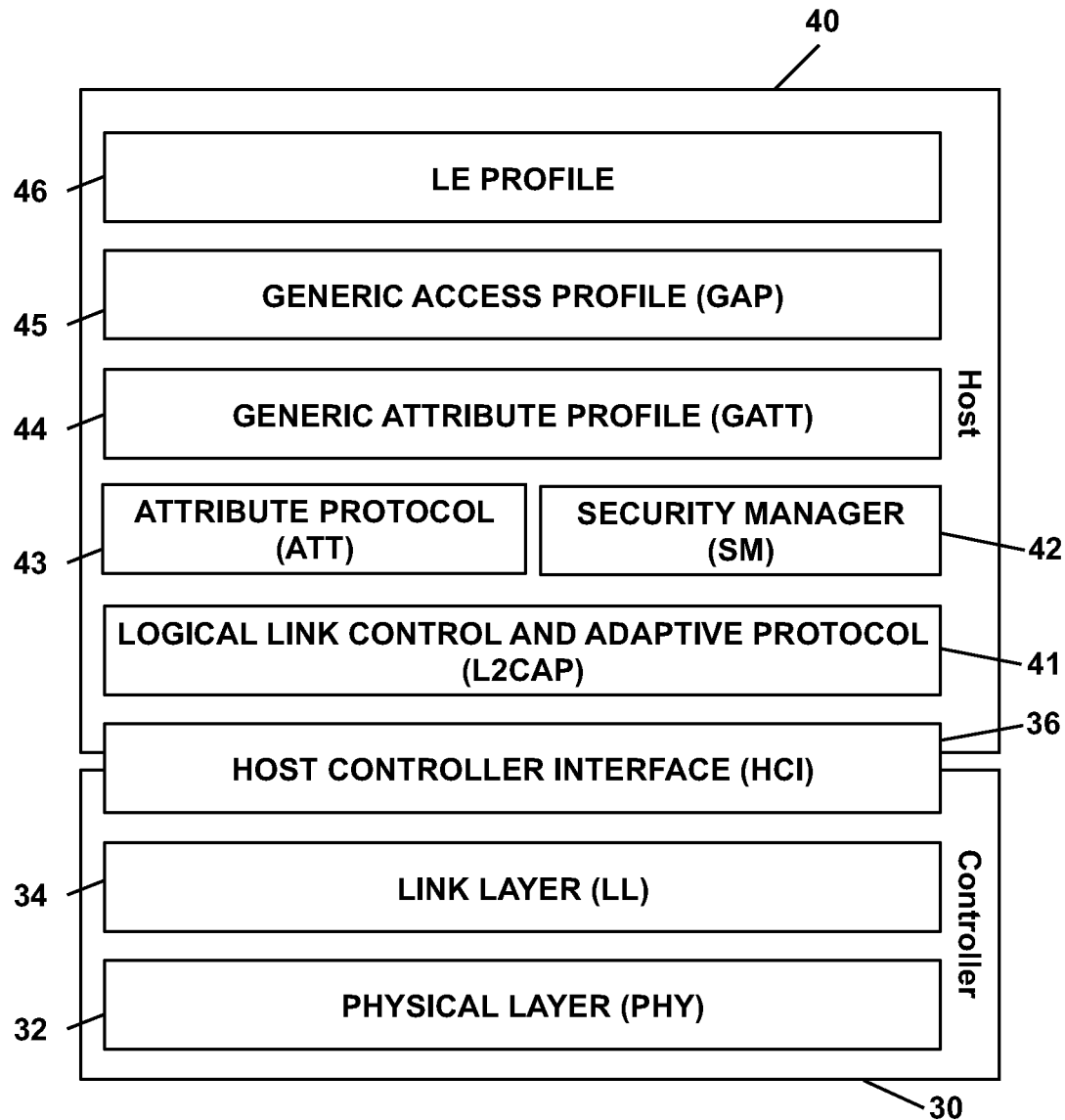
FIG. 3 shows an example of a BLE communication architecture to which the methods proposed in this disclosure are applicable.

FIG. 3 shows an example of a BLE communication architecture to which the methods proposed in this disclosure are applicable. More specifically, a BLE protocol stack includes a Controller stack 30 operable to control a timing critical radio interface and a Host stack 40 operable to deal with high level data. The Controller stack 30 may be implemented by using a communication module and a processor module which may include a processing device such as a microprocessor. The Host stack 40 may be implemented as a part of an operating system (OS) running on the processor module or instantiation of a package above the OS.

The Controller stack 30 includes a physical layer (PHY) 32, a link layer 34, and a Host Controller Interface (HCI) 36. The physical layer (or a wireless transceiver module) 32 is a layer for transmission and reception of wireless signals of 2.4 GHz and uses Gaussian Frequency Shift Keying (GFSK) modulation and a frequency hopping scheme using 40 RF channels. The link layer 34 is responsible for transmission and reception of Bluetooth packets and provides capabilities of creating a connection between devices after advertising and scanning using 3 advertising channels and transmitting and receiving data packets of up to 42 bytes over 37 data channels. The HCI 36 provides an interface between the Host stack and the Controller stack such that the Host stack can provide the Controller stack with commands and data and the Controller stack can provide the Host stack with events and data.

The Host stack 40 includes a Logical Link Control and Adaptation Protocol (L2CAP) 41, a Security Manager (SM) 42, an Attribute Protocol (ATT) 43, a Generic Attribute Profile (GATT) 44, a Generic Access Profile 45, and an LE profile 46. The Host stack 40 is not limited to this example and may include various protocols and profiles. The Host stack 40 multiplexes various protocols and profiles provided by the Bluetooth specification using the L2CAP.

The L2CAP 41 may provide one bidirectional channel for transferring data according to a specific protocol or profile.

The Security Manager 42 is a protocol for authenticating a device and providing key distribution.

The ATT protocol 43 defines rules for one device to access data of the other device in the server-client structure. The ATT protocol defines six (6) types of messages (Request, Response, Command, Notification, Indication, and Confirmation), as follows:

(1) Request and Response messages: The Request message is transmitted to the server by the client to request specific information. The Response message is transmitted from the server to the client to reply to the Request message.

(2) Command message: The Command message is transmitted to the server by the client to request the server to take a specific action. The server sends no response to the Command message to the client.

(3) Notification message: The Notification message is transmitted to the client by the server to notify the client of an event or the like. The client sends no confirmation in response to the Notification message to the server.

(4) Indication and Confirmation messages: The Indication message is transmitted to the client by the server to notify the client of an event or the like. Unlike the Notification message, the client sends the Confirmation message to the server in response to the Indication message.

The GATT profile 44 is operable as a protocol for describing how the ATT protocol 43 is used at the time of configuring a service. The GATT profile 44 provides another device with specific data (i.e. attribute) using the concept of Service and Characteristic. The GATT profile 44 defines two roles, i.e. a server which provides an attribute and a client to which the attribute is provided.

A service is any entity that can provide information, perform an action, or control a resource on behalf of another entity. The service may be implemented as software, hardware, or a combination of hardware and software. All of the information about the service that is maintained by an SDP server is contained within a single service record. Services are used to break data up into logic entities, and contain specific chunks of data called characteristics. Each service can have one or more characteristics, and distinguishes itself from other services by means of a unique ID called a UUID (Universal Unique Identifier).

A characteristic is a data array used in the service and each characteristic has its UUID. Each characteristic contains two attributes: a Characteristic Declaration and a Characteristic Value Declaration. The Characteristic Declaration is an attribute with Attribute Type (UUID) and Attribute Value, and the Attribute Value contains Characteristic Properties, Characteristic Value Handle, and Characteristic UUID. The Characteristic Value Declaration contains UUID for Characteristic Value and the Characteristic Value.

The GAP 45 is used to select a role for communication among BLE devices and control procedures of multi-profile operations. The GAP is primarily used for device discovery, connection creation, and security.

The LE profile 46 has dependency on the GATT profile and is mainly applied to BLE devices. For example, the LE profile includes Battery, Time, FindMe, Proximity, and the like.

Figure 4:
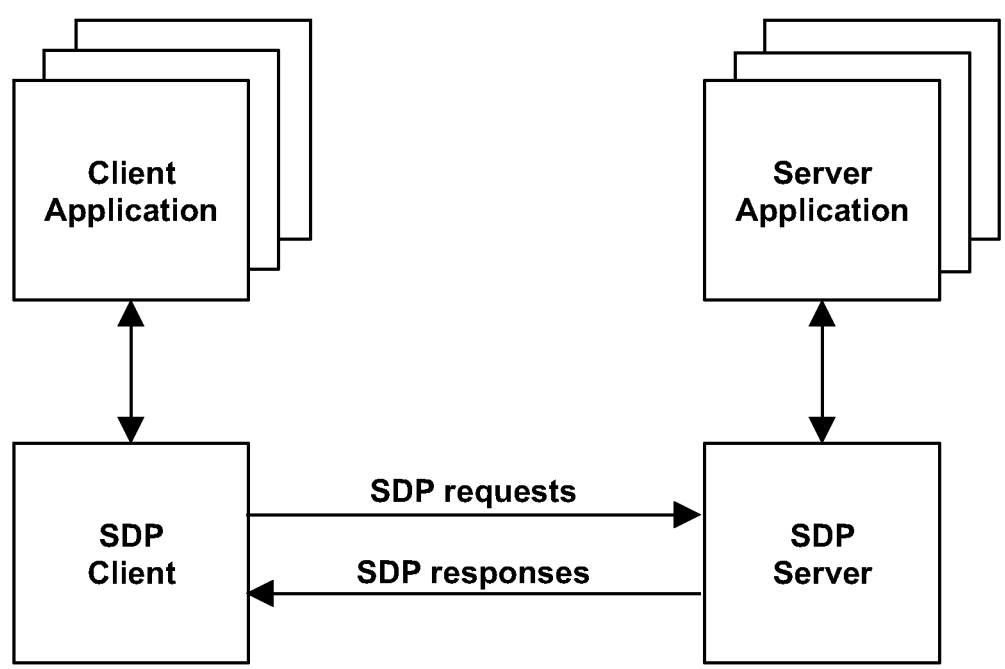
FIG. 4 shows a typical service discovery mechanism.

FIG. 4 shows a typical Bluetooth service discovery mechanism. The service discovery mechanism provides means for client applications to discover the existence of services provided by server applications as well as the attributes of those services. The attributes of a service include the type or class of the service offered and a mechanism or protocol information needed to utilize the service. The Service Discovery Protocol (SDP) involves communication between an SDP server and an SDP client. The server maintains a list of service records that describe the characteristics of services associated with the server. Each service record contains information about a single service. The client can retrieve information from a service record maintained by the SDP server by issuing an SDP request.

If the client, or an application associated with the client, decides to use a service, it opens a separate connection to the service provider in order to utilize the service. SDP provides a mechanism for discovering services and their attributes (including associated service access protocols). The SDP uses UUIDs in order to distinguish between services. If the SDP client knows the UUID of a service to find, it uses the UUID to inquire of the server about whether the server provides the service. If the SDP client does not know the UUID of a service to find, it asks the server for information about services provided by the server. If multiple applications on a device provide services, an SDP server can act on behalf of those service providers to handle requests for information about the services that they provide. Similarly, multiple client applications can utilize an SDP client to query servers on behalf of the client applications.

In the typical Bluetooth service discovery mechanism, service discovery commands are standardized as the BLE protocol, but search methods and search order differ according to operating systems (OSs). The process of service discovery is a time consuming process and can lead to undesirable delay when multiple devices are in close proximity to each other.

FIG. 5 shows an example of a typical structure of an Attribute stored in a GATT server. The server uses such attributes to provide services. Each attribute contains four elements and each element has the following meaning:

Attribute Handle: An identifier (or an index) corresponding to a specific attribute.

Attribute Type: A type of an attribute (a UUID describing an attribute value).

Attribute Value: A value of an attribute (data indexed by the handle).

Attribute Permission: Permission associated with an attribute specifying that it may be read and/or written.

FIG. 6A shows a general packet structure defined by the BLE protocol. The Link Layer has only one packet format used for both advertising channel packets and data channel packets. Each packet consists of four fields: a preamble, an Access Address, a PDU header, a PDU payload, and a CRC field. All packets include a PDU header and the PDU header determines the type of advertisement broadcast or logical link. When a packet is transmitted in an advertising physical channel, the PDU shall be an Advertising Channel PDU. When a packet is transmitted in a data physical channel, the PDU shall be a Data Channel PDU. Advertising Channel PDUs are classified into advertising PDUs, scanning PDUs, and Initiating PDUs. The Data Channel PDU has a 16 bit header, a variable size payload, and may include a Message Integrity Check (MIC) field.

FIG. 6B shows an example of a structure of an Attribute Protocol PDU which can be used to communicate an attribute value. As shown in FIG. 6B, the Attribute Protocol PDU may include an Attribute Opcode field, an Attribute Parameters field, and an Authentication Signature field (optional). The Authentication Signature field is an optional field and selectively exists or does not exist.

The Attribute Opcode is data of one (1) octet and includes information indicating what kind of PDU the Attribute protocol PDU is. FIG. 7 is a table showing an example of a list of Attribute Opcodes and Attribute parameters of Attribute protocol PDUs. The Attribute parameters include information to be transferred in an actual message and may have the following values:

Handle: Reference information corresponding to data (or an index). By using the handle, a GATT client may refer to, access, or change a value.
Value: A value of data.
Data List: A list of multiple values of data.
Length: A length of data.

By using the Attribute protocol PDU as described above, the client can read an attribute handle value, an attribute value, a data list, or a length value stored in the server, or can store the value in the server.

FIG. 8 shows an example of a service structure (i.e. an attribute database) of a conventional BLE device. The BLE device in which the service structure shown in FIG. 8 is implemented is, for example, an electronic timepiece. Each service is used to logically break up data and includes one or more characteristics. As shown, Watch Service, which is a primary service, includes a plurality of characteristics (ServiceN1, ServiceN2, . . . , ServiceNx). In this example, the service Watch Service includes x characteristics. These plurality of characteristics include BLE specification setting, BLE watch setting, or the like, for example. Each service has a UUID, that is, a 16-bit or 128-bit identifier. Further, as described above, each characteristic contains two attributes, i.e. the Characteristic Declaration and the Characteristic Value Declaration. For example, the Characteristic Declaration of ServiceN1 contains Attribute Type (a UUID of Characteristics) and Attribute Value which contains Characteristic Properties, Characteristic Value Handle, and Characteristic UUID (a UUID of ServiceN1). The Characteristic Value declaration of ServiceN1 contains a UUID for Characteristic Value (the UUID of ServiceN1) and the Characteristic Value (a value of ServiceN1).

In the conventional BLE device, the service is configured so as to have one characteristic for one function, as shown in FIG. 8. This conventional service structure has an advantage of easiness of design of the service and interpretation of data because it assigns a handle to each characteristic value and can fix data structure for each handle. On the other hand, the conventional service structure has a disadvantage in that it takes a considerable time for another device to discovery services of the device, and as a result, the connection requires a long time to be completed. This disadvantage becomes more apparent as the number of characteristics increases. In addition, in the case that one or more functions are added to the server device, it is required to change the program of the server device to add service(s) or characteristic(s).

FIG. 9 shows an example in which the primary service Watch Service of the BLE device of FIG. 8 is configured according to an embodiment of the present invention. As shown in FIG. 9, Watch Service includes only two characteristics; a characteristic for date request and a characteristic for data communication. The characteristic for data request is a characteristic used for the client to request data from the server. The characteristic for data communication is a characteristic used for data communication between the server and the client. Conventionally, data which is a characteristic value is stored in the Attribute Value field of each characteristic and each characteristic distinguishes itself from other characteristics by means of the UUID. Unlike the conventional service structure in which one characteristic corresponds to one function, a service is configured so as to have two integrated-type characteristics regardless of the number of functions in the present embodiment. In the present embodiment, the characteristic values (i.e. ServiceN1 value to ServiceNx value) which are setting values of a plurality of functions corresponding to the plurality of characteristics of FIG. 8 are stored as Attribute Value of the characteristic for data communication.

In the embodiment shown in FIG. 9, the service is configured by the two kinds of characteristics for the following reasons. In the case that one service provides setting values of a plurality of functions, a plurality of kinds of predetermined data which are the setting values are handled by the one characteristic for data communication and only one handle is given to the plurality of kinds of data. Thus, a conventional Read Request message which uses only an Attribute Handle as its parameter (see FIG. 7) cannot be used for the present embodiment. Therefore, the characteristic for data communication is specially required and the service consists of the two characteristics, i.e. the characteristic for data request and the characteristic for data communication. The service structure described above is an example and the present invention is not limited to this example. In other embodiments, a plurality of services are integrated as one service and a plurality of services may exist as conventional. In addition, the service may contain only one characteristic, as will be described later.

Since various kinds of data cannot be distinguished by the handles in the case that the service consists of the two integrated-type characteristics as described above, distinguishing information is used to distinguish a plurality of kinds of data in many embodiments of the present invention. It is desirable to manage the distinguishing information as the specification such that each of the communication devices can hold the same distinguishing information. A piece of distinguishing information is stored in connection with a corresponding kind of data. More specifically, in the server, [a piece of distinguishing information+one kind of data corresponding to the piece of distinguishing information] is stored in a space allocated to store the one kind of data. For this, a space for storing the piece of distinguishing information (for example, one byte) is required, and the space for storing the data is reduced as much. The piece of distinguishing information may be recorded before or after the one kind of data.

In the case of requesting one kind of data, a piece of distinguishing information of the one kind of data to be requested is stored in a data field of a packet. Further, in the case of transmitting one kind of data, the one kind of data and a piece of distinguishing information of the one kind of data are stored in the data field of a packet. More specifically, the piece of distinguishing information or [the piece of distinguishing information+the corresponding one kind of data] is stored in the Attribute Parameters field of the Attribute Protocol PDU as Attribute Value, as shown in FIG. 6, for example. Thus, the space for storing the piece of distinguishing information is required and the space for storing the one kind of data is reduced as much. For example, in the case that one (1) byte is used to store the piece of distinguishing information, the space for storing the one kind of data is (the space allocated to Attribute Value−1 byte). The piece of distinguishing information may be recorded before or after the one kind of data. In the case of storing one kind of data in the client device, it is also desirable to store the one kind of data in connection with a piece of distinguishing information corresponding to the one kind of data.

According to the embodiment, the use of the integrated-type characteristics reduces the time required for the service discovery, thereby reducing the connection time. Further, it is unnecessary to add a service or a characteristic even in the case that a new function is added. In the case that a function specified by the specification of the current version is to be added to the server device, it is only necessary to add the setting value of the function and its corresponding piece of distinguishing information as an attribute of the characteristic for data communication in the attribute database as shown in FIG. 9. In this case, the convenience of the user can be enhanced if the firmware of the device is designed such that the piece of distinguishing information can be automatically assigned according to the function when the user is programming to add the function. Further, the firmware may be designed such that the user can add a new function which is not included in the current version of the specification. In this case, a new piece of distinguishing information is created to distinguish the setting value of the function. Preferably, the newly created piece of distinguishing information has a unique value different from those assigned to setting values of different functions. In addition, the user may add the piece of distinguishing information by using the website managed by the Bluetooth Standard Group. The specification to which the new piece of distinguishing information has been added can be applied to the communication devices by update of the firmware, or the like.

Hereinafter, the present invention will be described more specifically by using specific embodiments. In the embodiments shown in FIGS. 10 to 14, the first device 100 operates as the server, and the application of the smart phone which is the second device 200 operates as the client.

Figure 10:
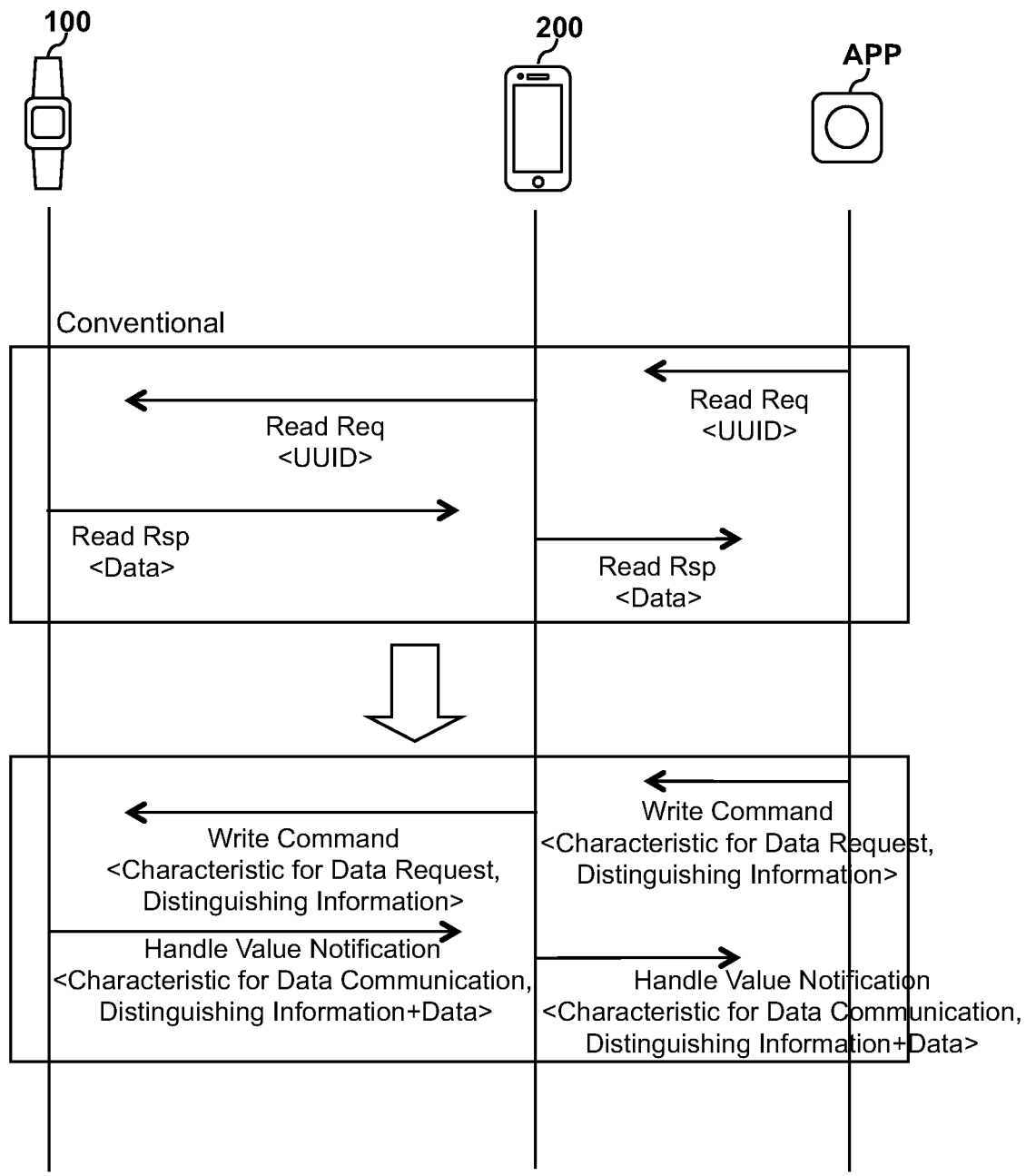
FIG. 10 shows a method by which a client requests data from a server.

FIG. 10 shows a method by which the client requests one kind of data from the server according to an embodiment, together with a conventional method. The one kind of data is an attribute value. Conventionally, the client transmits the Read Request message to the server in order to request data. The Read Request message uses the Attribute Handle as its parameter (i.e. Attribute Handle parameter), as shown in FIG. 7. The Attribute Handle is a 16-bit value that is assigned by the server to its own attributes to allow the client to reference those attributes. In the case that the client wants to read a Characteristic Value from the server, it sets the Attribute Handle Parameter of the Read Request message to the Characteristic Value Handle. The value of the characteristic having the specific UUID can be accessed by the Handle. In the case that the Read Request from the client is valid, the server transmits the requested kind of data to the client by a Read Response message. As shown in FIG. 7, the Read Response message uses the Attribute Value as its parameter (i.e. Attribute Value parameter). In this case, the value transmitted by the Read Response message is the Characteristic value.

In the present embodiment, the service of the server consists of the characteristic for data request and the characteristic for data communication, as described above. Thus, if the Read Request message is used to request data from the server, only the Handle Value of the characteristic for data request can be used as its parameter. As a result, it is impossible to read various kinds of data by the Read Request message. Therefore, according to the present embodiment, the Read Request message is not used, and instead, a Write Command message and the distinguishing information are used, in order to request data from the server. An Attribute Handle and an Attribute Value which are parameters of the Write Command are set to the Characteristic Value Handle of the characteristic for data request and a piece of distinguishing information, respectively (see FIG. 7 for the parameters of the Write Command). Since the server sends no response to the Command message, the Notification message is used to transmit one kind of data corresponding to the piece of distinguishing information to the client in the present embodiment. As shown in FIG. 10, the server transmits the one kind of data requested by the client by transmitting to the client a Handle Value Notification message with an Attribute Handle parameter and an Attribute Value parameter set to the Characteristic Value Handle of the characteristic for data communication and [the piece of distinguishing information+the one kind of data], respectively. In the case of receiving the Handle Value Notification message, the client interprets the first one byte of the Attribute Value as the piece of distinguishing information of the kind of data. By this, the client can determine the kind of the data received from the server. The position in which the piece of distinguishing information is recorded (before or after the data) and/or the size of the space for storing the piece of distinguishing information is not limited to this embodiment.

Although the Command message and the Notification message which are not accompanied by responses are used for data request and data transmission, respectively, in the present embodiment, the present invention is not limited thereto. In an embodiment, the client requests data by transmitting a Write Request message to the server. In this case, an Attribute Handle parameter and an Attribute Value parameter of the Write Request message are set to the Characteristic Value Handle of the characteristic for data request and the piece of distinguishing information, respectively (see FIG. 7 for the parameters of the Write Request). In the case that the Attribute Value is successfully written, the server sends a Write Response message to the client. This embodiment has an advantage in that it can be confirmed that the Write Request message has been successfully received by the server, but has a disadvantage in that the server consumes additional power to send the response message. Particularly, in the case that the server is a device with a small battery capacity (for example, an electronic timepiece or a watch-type wearable device), the use of the Write Command message is more desirable in terms of reduction of power consumption.

In another embodiment, the server uses a Handle Value Indication message instead of the Handle Value Notification message in order to transmit data to the client. Both of the Notification message and the Indication message are used by the server to notify the client of data. However, they are different in that the Notification message is not accompanied by any response message from the client even when the Notification message has been successfully received by the client while the Indication message is accompanied by the Confirmation message. In this embodiment, the server transmits the kind of data requested by the client by transmitting to the client the Handle Value Indication message with an Attribute Handle parameter and an Attribute Value parameter set to the Characteristic Value Handle of the characteristic for data communication and [the piece of distinguishing information+the kind of data], respectively.

In the case of receiving the Handle Value Indication message, the client responds to it by a Handle Value Confirmation message. By receiving the Handle Value Confirmation message, the server can determine that the client has successfully received the data. The present embodiment is advantageous in the case of transmitting data of high importance because the server can determine whether or not the data has been successfully received by the client. On the other hand, the present embodiment is disadvantageous in that the client consumes additional power to send the response message. Particularly, in the case that the client is a device with a small battery capacity (for example, a watch-type wearable device), the use of the Notification message is more desirable in terms of reduction of power consumption. Therefore, it is possible to decide whether to use the Notification message or the Indication message based on the importance of data and/or the power consumption.

Figure 11:
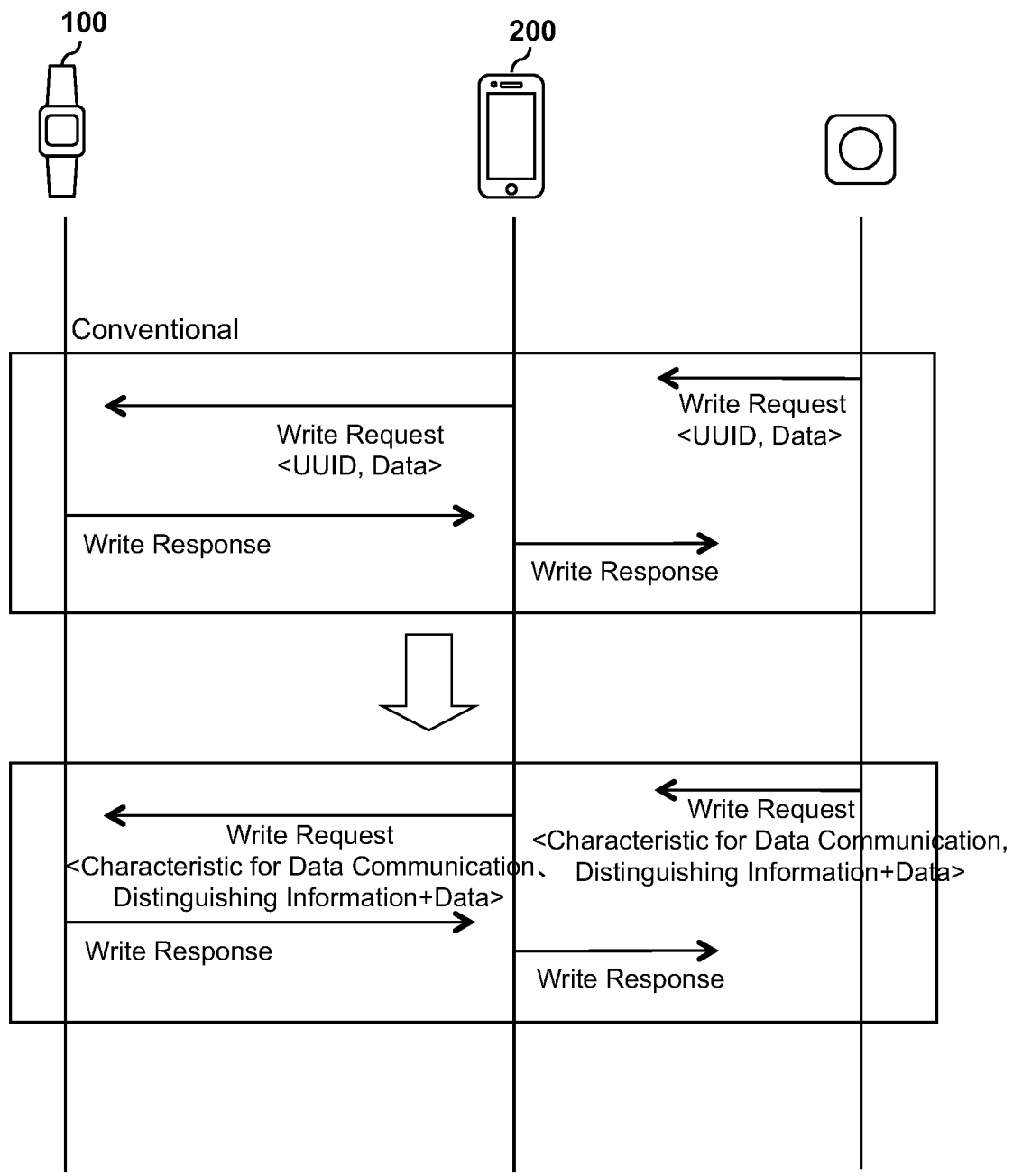
FIG. 11 shows a method for writing data by a Write Request message.

FIG. 11 shows a method for writing data by a Write Request message according to an embodiment, together with a conventional method. Conventionally, the client transmits to the server a Write Request message with the Attribute Handle parameter and the Attribute Value parameter set to a handle of an attribute in which data is to be written and the data to be written, respectively, as shown in the drawing. The server can write the data by accessing the characteristic value of a specific UUID corresponding to the handle. In the case that the data is successfully written, the server sends a Write Response message to the client.

According to the present embodiment, the service of the server consists of the characteristic for data request and the characteristic for data communication, as described above. Thus, in the case that the client wants to request the server to write data, it can save only the handle value of the characteristic for data communication as the Attribute Handle parameter of a Write Request message. It is impossible to access various kinds of data by this Attribute Handle parameter. In some embodiments of the present invention, in the case that the client wants to request the server to write one kind of data, it sets the Attribute Value parameter of the Write Request message to [a piece of distinguishing information of the one kind of data+the one kind of data]. More specifically, the client stores the piece of distinguishing information of the kind of data to be written in one byte of the space for storing an attribute value in the Attribute Parameters field of the payload shown in FIG. 6B. By this, the server can distinguish a plurality of kinds of data by a plurality of pieces of distinguishing information even though the same handle value is assigned to the plurality of kinds of data. The size of the space in which the piece of distinguishing information is stored is not limited to one byte, and may be bigger or smaller than one byte according to embodiments. In the case that the data is successfully written, the server sends a Write Request message to the client.

Figure 12:
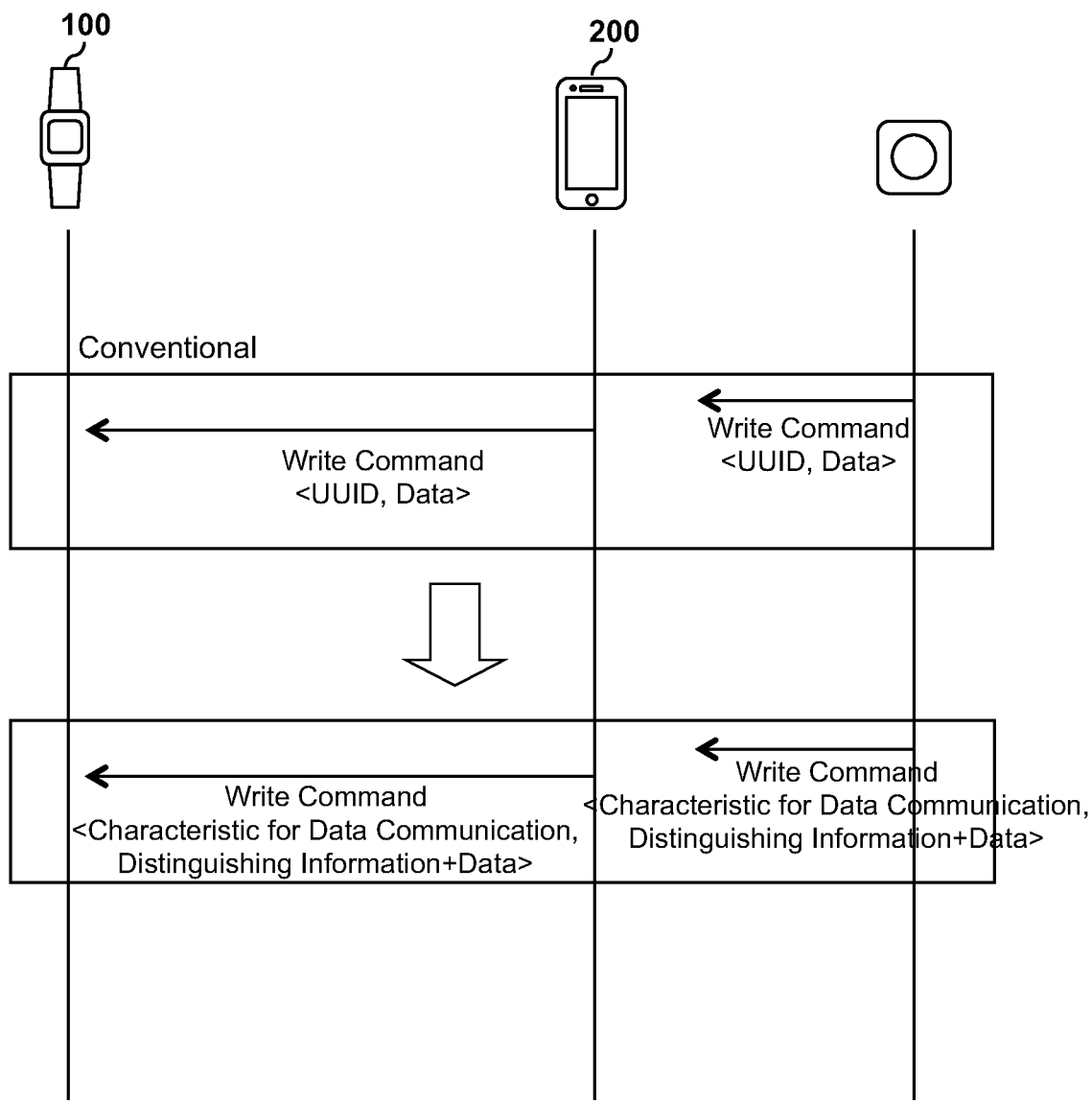
FIG. 12 shows a method for writing data by a Write Command message.

FIG. 12 shows a method for writing data by a Write Command message according to an embodiment, together with a conventional method. Conventionally, the client transmits to the server a Write Command message with the Attribute Handle parameter and the Attribute Value parameter set to a handle of an attribute in which data is to be written and the data to be written, respectively, as shown in the drawing. The server can write the data by accessing the characteristic value of a specific UUID corresponding to the handle. The Command message is not accompanied by a response message.

According to the present embodiment, the service of the server consists of the characteristic for data request and the characteristic for data communication, as described above. Thus, in the case that the client wants to request the server to write data, it can save only the handle value of the characteristic for data communication as the Attribute Handle parameter of a Write Command message. It is impossible to access various kinds of data by this Attribute Handle parameter. In some embodiments of the present invention, in the case that the client wants to request the server to write one kind of data, it sets the Attribute Value parameter of the Write Command message to [a piece of distinguishing information of the one kind of data+the one kind of data]. More specifically, the client stores the piece of distinguishing information of the one kind of data to be written in one byte of the space for storing an attribute value in the Attribute Parameters field of the payload shown in FIG. 6B. By this, the server can distinguish a plurality of kinds of data by a plurality of pieces of distinguishing information even though the same handle value is assigned to the plurality of kinds of data. The size of the space in which the piece of distinguishing information is stored is not limited to one byte, and may be bigger or smaller than one byte according to embodiments.

Figure 13:
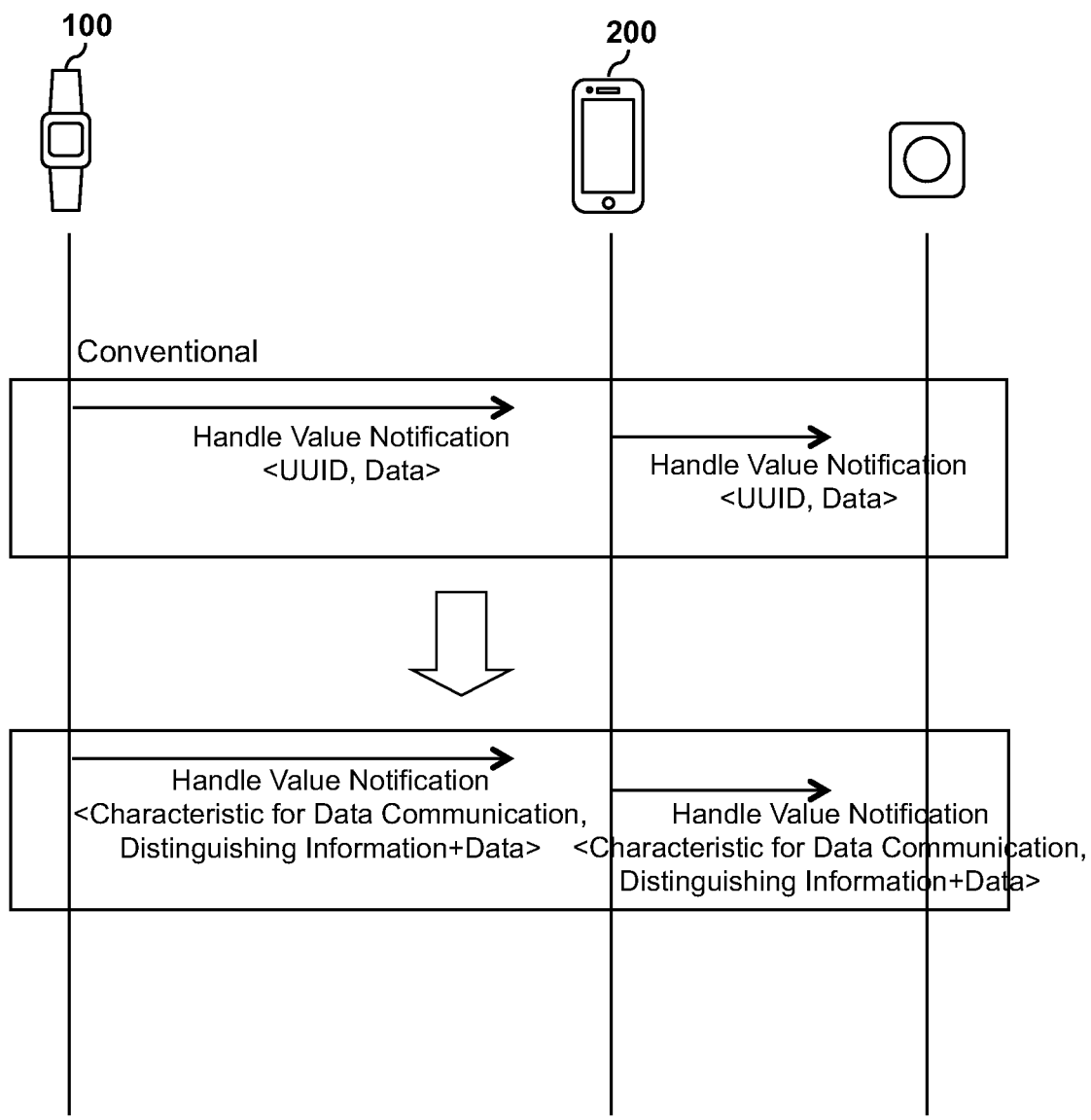
FIG. 13 shows a method for transmitting a Notification message from a server to a client.

FIG. 13 shows a method for transmitting a Notification message from the server to the client according to an embodiment, together with a conventional method. Conventionally, the server transmits data to the client by transmitting a Handle Value Notification message with the Attribute Handle parameter and the Attribute Value parameter set to a Characteristic Value Handle of a Characteristic Value which is the data to be notified and the data, respectively, as shown in the drawing. Even in the case of receiving the Notification message, the client does not send a response message in response to the Notification message. Therefore, it is desirable to use the Notification message in the case that the importance of the data is low and the power consumption of the server is important.

According to the present embodiment, the server transmits a kind of data to the client by using a Handle Value Notification message with the Attribute Value parameter set to [a piece of distinguishing information of the one kind of data+the one kind of data]. Since the one kind of data is distinguished by the piece of distinguishing information, the Attribute Handle parameter of the Handle Value Notification message is not important. Thus, the Attribute Handle parameter may be set to the Characteristic Value Handle of the characteristic for data communication, for example. In the case of receiving the Handle Value Notification message, the client interprets the first one byte of the Attribute Value as the piece of distinguishing information of the one kind of data. The position in which the piece of distinguishing information is recorded (before or after the data) and/or the size of the space for storing the piece of distinguishing information is not limited to this embodiment.

Figure 14:
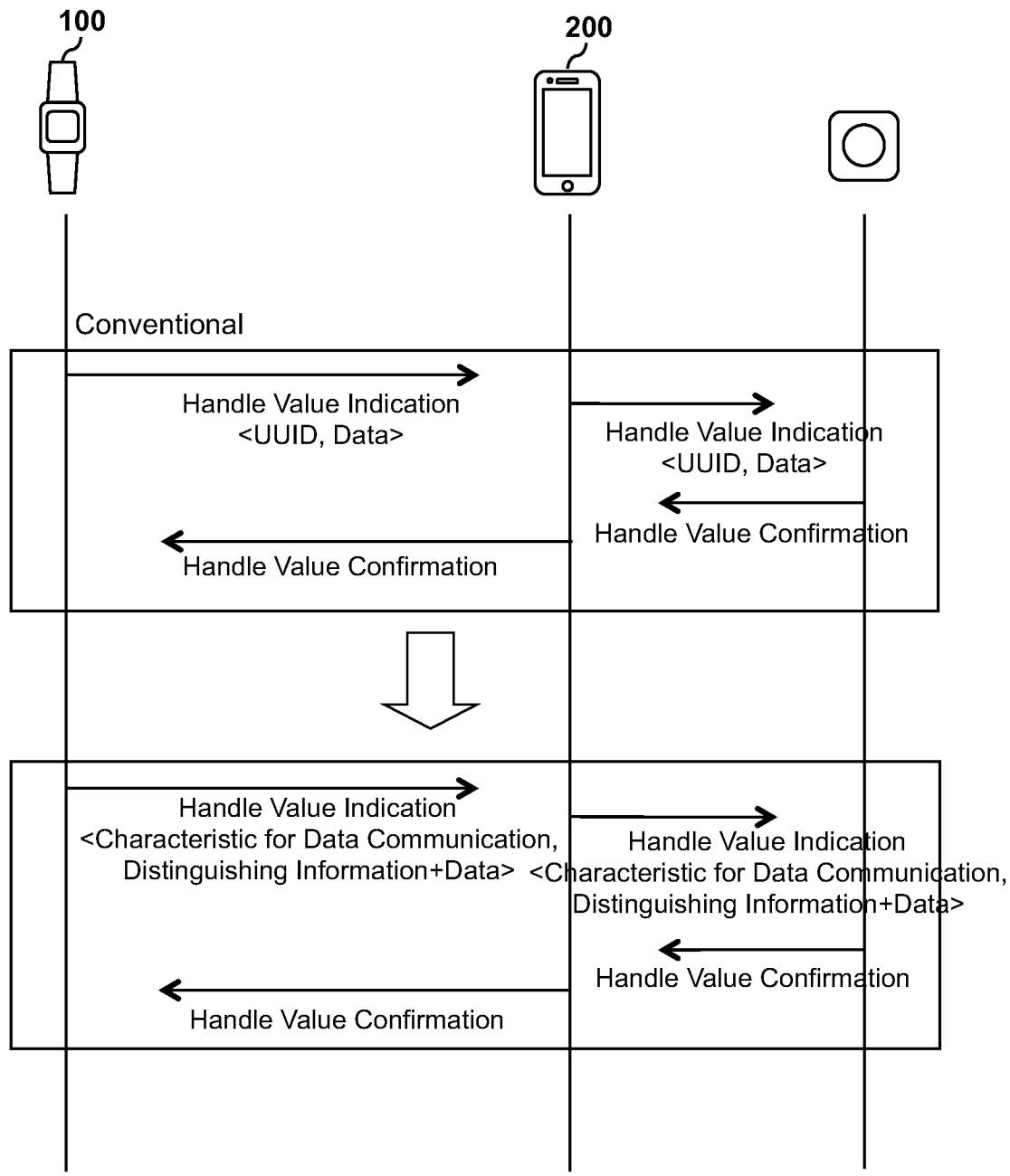
FIG. 14 shows a method for transmitting an Indication message from a server to a client.

FIG. 14 shows a method for transmitting an Indication message from the server to the client according to an embodiment, together with a conventional method. Conventionally, the server transmits data to the client by transmitting a Handle Value Indication message with the Attribute Handle parameter and the Attribute Value parameter set to a Characteristic Value Handle of a Characteristic Value which is the data to be notified and the data, respectively, as shown in the drawing. In the case of receiving the Handle Value Indication message successfully, the client sends a Handle Value Confirmation message to the server in response to the Handle Value Indication message. It is desirable to use the Indication message in the case that the importance of the data is high.

According to the present embodiment, the server transmits one kind of data to the client by using a Handle Value Indication message with the Attribute Value parameter set to [a piece of distinguishing information of the one kind of data+the one kind of data]. Since the one kind of data is distinguished by the piece of distinguishing information, the Attribute Handle parameter of the Handle Value Indication message is not so significant. Thus, the Attribute Handle parameter may be set to the Characteristic Value Handle of the characteristic for data communication, for example. In the case of receiving the Handle Value Indication message, the client interprets the first one byte of the Attribute Value as the piece of distinguishing information of the one kind of data. The position in which the piece of distinguishing information is recorded (before or after the data) and/or the size of the space for storing the piece of distinguishing information is not limited to this embodiment. The client sends a Handle Value confirmation message in response to the Handle Value Indication message to the server in order to confirm the receipt of the Handle Value Indication message.

Based on the service structure, data request, data writing, and data notification, a method for data exchange between the server and the client can be defined. Hereinafter, several embodiments of the data exchange method according to various scenarios will be described.

First Embodiment

In a first embodiment, the first device 100 operates as a server, and an application of the device 200 operates as a client. The first device 100 contains the service configured as shown in FIG. 9. In other words, the service of the first device 100 consists of two characteristics, i.e. the characteristic for data request and the characteristic for data communication. Further, in the present embodiment, the data request, data writing, and data notification described above are combined for data communication. The first device 100 and the application of the second device 200 do not fix the order of communication such as the data request or data writing in advance and the determination of the order of communication is left to the application of the second device 200.

The application of the second device 200 which is the client performs the data request (see FIG. 10) or the data writing (see FIGS. 11 and 12), as necessary. Since the client (i.e. the application of the second device 200) may request data from the first device 100 at appropriate timing (for example, when a screen transition occurs) if necessary, it may not store the data received from the first device 100.

Figure 15:
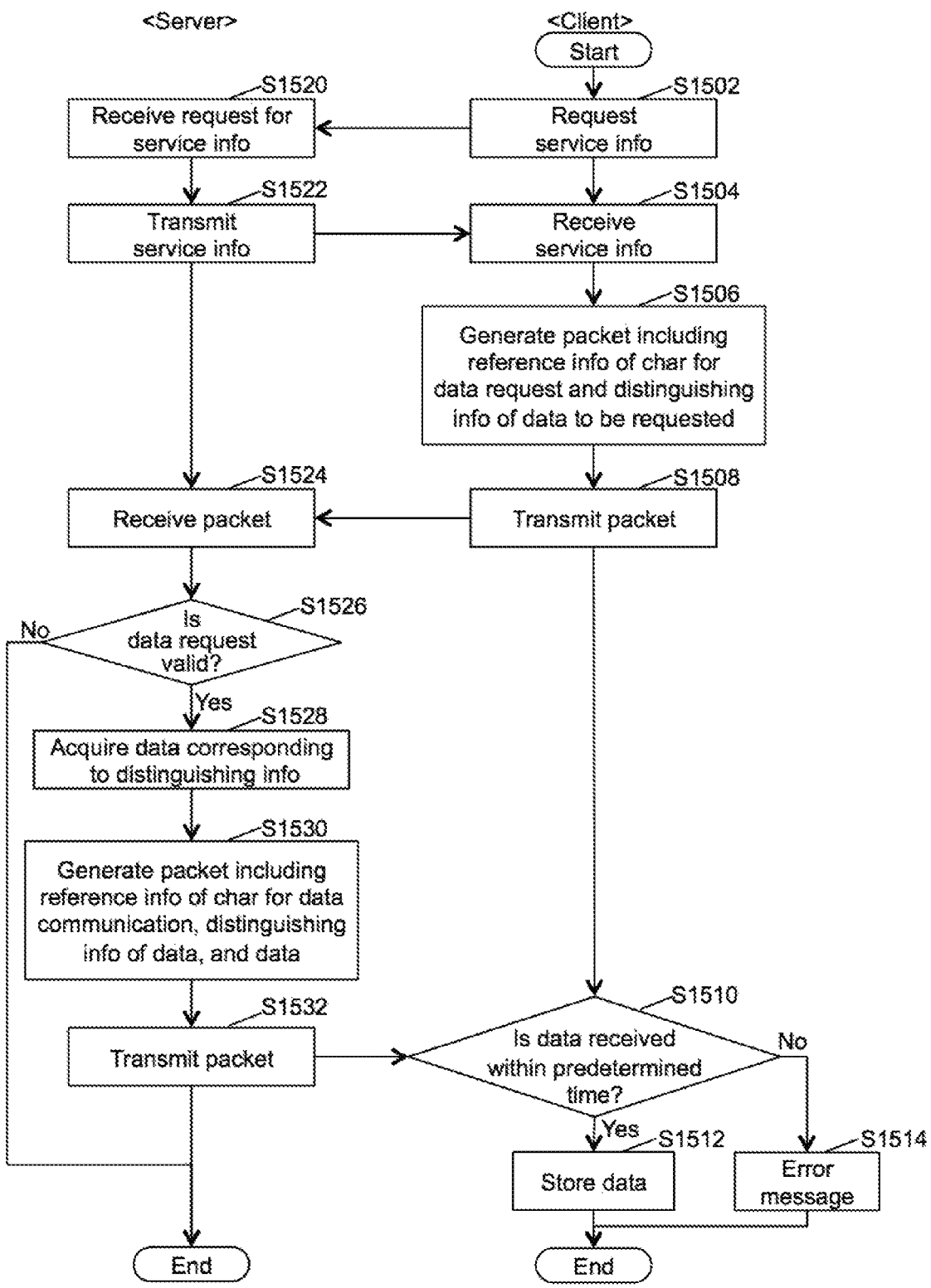
FIG. 15 is a flow chart showing an example of a data requesting process.

FIG. 15 is a flow chart showing an example of a data requesting process according to the first embodiment. FIG. 15 will be described in detail below with reference to FIGS. 2A and 2B. In this example, the first device 100 is the server and the application of the second device 200 is the client.

Once a physical connection and a logical channel are established between the first device 100 and the second device 200, the second device 200 discovers available services and makes a request for service information to the first device 100 through the short-distance transmitter and receiver 204 to acquire information on the discovered services (Step S1502). In the case that the first device 100 receives the request for the service information (Step S1520), it reads out information on services stored in the memory 108 and transmits the service information including the reference information of the services and characteristics (for example, indices such as the handles) to the second device 200 via the short-distance transmitter and receiver 102 (Step S1522). The service information includes the reference information of the characteristic for data request and the characteristic for data communication (for example, indices such as the handles of the characteristics). The second device 200 receives the service information via the short-distance transmitter and receiver 204 (Step S1504), and stores the service information in a storage unit (for example, the memory 108). Then, the processor 206 of the second device 200 generates a packet including the reference information of the characteristic for data request and a piece of distinguishing information of one kind of data to be requested (Step S1506). The piece of distinguishing information of the one kind of data to be requested is acquired from the memory 108. As described above, the packet is the Write Command message, for example. Next, the packet is transmitted to the first device 100 via the short-distance transmitter and receiver 204 (Step S1508).

In the case of receiving the packet via the short-distance transmitter and receiver 102 (Step S1524), the processor 104 of the first device 100 analyses the packet. More specifically, based on the reference information of the characteristic and the piece of distinguishing information included in the packet, the processor 104 of the first device 100 determines that the second device 200 requests the one kind of data corresponding to the piece of distinguishing information. In the case that the request is valid, i.e. the second device 200 has the authority to request the kind of data from the first device 100 and it is possible to read the requested kind of data (Step S1526: Yes), the first device 100 acquires the kind of data corresponding to the piece of distinguishing information from the memory 108 (Step S1528). The processor 104 generates a packet including the reference information of the characteristic for data communication included in the service information, the piece of distinguishing information of the kind of data, and the kind of data (Step S1530). The packet is transmitted to the second device 200 by the short-distance transmitter and receiver 102 (Step S1532). As described above, the packet is the Handle Value Notification message, for example.

In the case of receiving a packet including the one kind of data within a predetermined period of time (for example, waiting time set to receive a response to the data request) via the short-distance transmitter and receiver 204 (Step S1510: Yes), the processor 206 of the second device 200 extracts the one kind of data from the packet and stores it in the memory 208 (Step S1512). By this, the data requesting process shown in FIG. 15 ends.

On the other hand, in the case that the request from the second device 200 is invalid (Step S1526: No), the first device 100 terminates the process. Further, in the case that the second device 200 does not receive the packet including the one kind of data from the first device 100 within the predetermined period of time or receives an error message (Step S1510: No), the second device 200 informs the user that the request for data has failed (Step S1514) by displaying an error message on the display 214, for example. Then, the data requesting process ends. In this case, the process returns to Step S1508 and the application of the second device 200 may make a request for the one kind of data to the first device 100 again.

Figure 16:
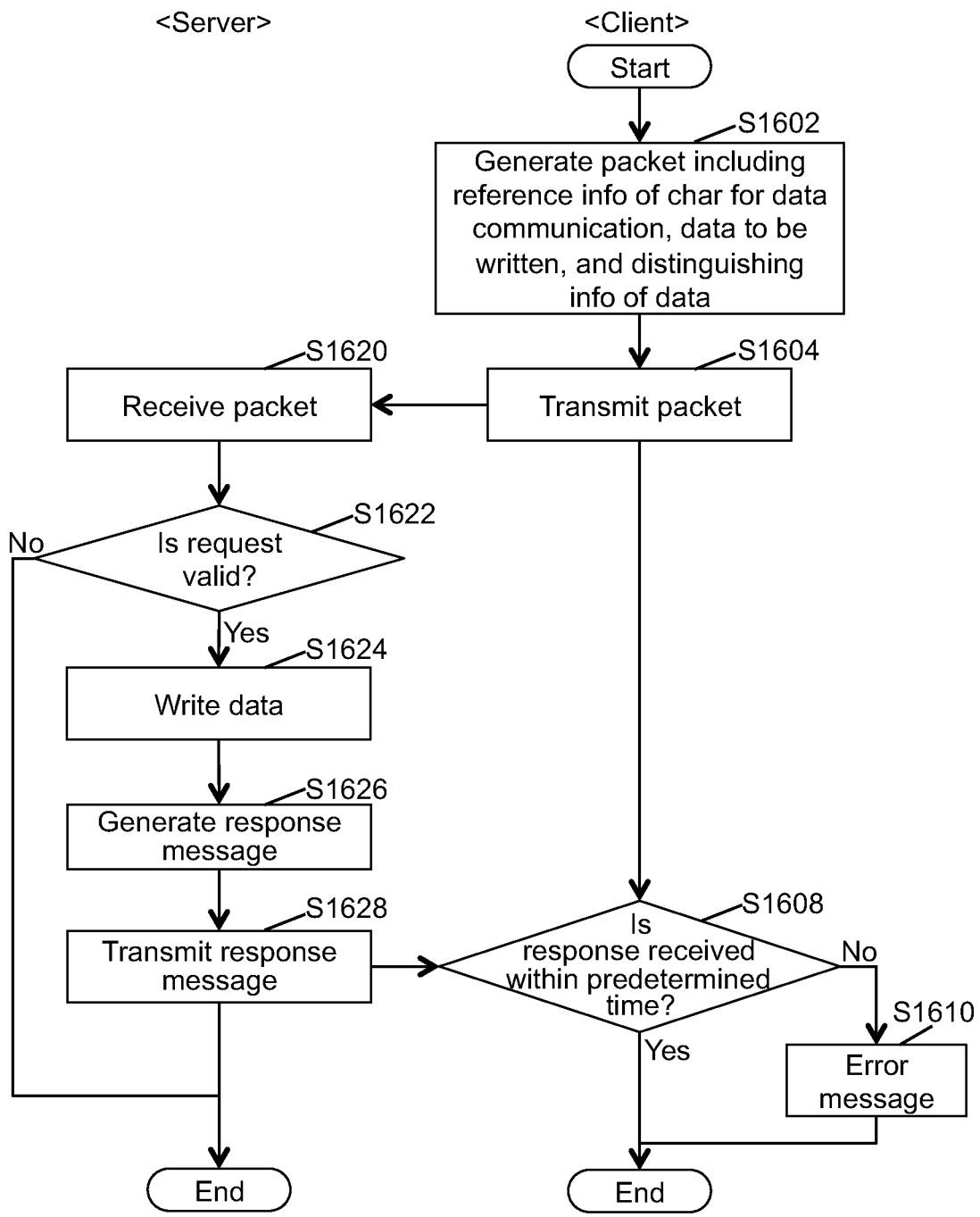
FIG. 16 is a flow chart showing an example of a data writing process.

FIG. 16 is a flow chart showing an example of a data writing process according to the first embodiment. FIG. 16 will be described in detail below with reference to FIGS. 2A and 2B. In this example, the first device 100 is the server and the application of the second device 200 is the client. The following description is based on the premise that the service discovery procedure (Steps S1502, S1504, S1520, and S1522) described with regard to FIG. 15 has already been performed.

The processor 206 of the second device 200 generates a packet including the reference information of the characteristic for data communication (for example, an index such as the handle), one kind of data to be written, and a piece of distinguishing information of the one kind of data (Step S1602). As described above, the packet is the Write Request message, for example. Next, the packet is transmitted to the first device 100 via the short-distance transmitter and receiver 204 (Step S1604).

In the case of receiving the packet via the short-distance transmitter and receiver 102 (Step S1620), the processor 104 of the first device 100 analyses the packet. More specifically, based on the reference information of the characteristic and the piece of distinguishing information included in the packet, the processor 104 of the first device 100 determines that the second device 200 requests writing of the one kind of data corresponding to the piece of distinguishing information. In the case that the request is valid, i.e. the second device 200 has the authority to request data writing and it is possible to write the kind of data (Step S1622: Yes), the first device 100 writes the kind data in the memory 108 (Step S1624). In the case that the one kind of data is successfully written, the processor 104 generates the Write Response message which is a response message to the Write Request (Step S1626) and transmits the response message to the second device 200 via the short-distance transmitter and receiver 102 (Step S1628). In the case of receiving the response message within a predetermined period of time (for example, waiting time set to receive a response to the request for writing) via the short-distance transmitter and receiver 204 (Step S1608: Yes), the processor 206 of the second device 200 terminates the data writing process shown in FIG. 16.

On the other hand, in the case that the request for data writing from the second device 200 is invalid (Step S1622: No), the first device 100 terminates the process. Further, in the case that the second device 200 does not receive the response message from the first device 100 within the predetermined period of time or receives an error message (Step S1608: No), the second device 200 informs the user that writing of the one kind of data has failed (Step S1610) by displaying an error message on the display 214, for example. Then, the data writing process ends. In this case, the process returns to Step S1604 and the application of the second device 200 may make a request for writing the one kind of data to the first device 100 again.

Figure 17:
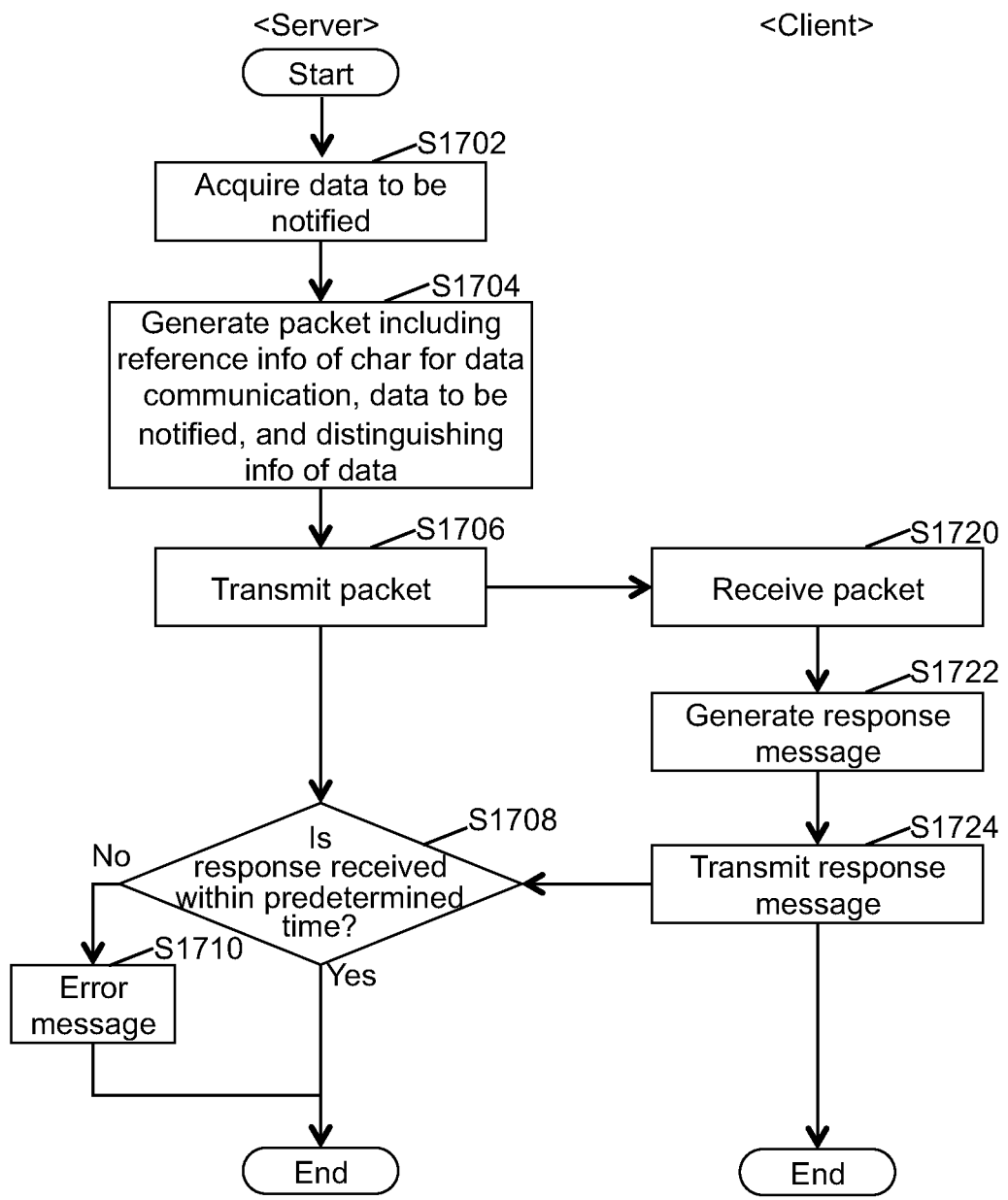
FIG. 17 is a flow chart showing an example of a data notifying process.

FIG. 17 is a flow chart showing an example of a data notifying process according to the first embodiment. FIG. 17 will be described in detail below with reference to FIGS. 2A and 2B. In this example, the first device 100 is the server and the application of the second device 200 is the client. The following description is based on the premise that the service discovery procedure (Steps S1502, S1504, S1520, and S1522) described with regard to FIG. 15 has already been performed.

The processor 104 of the first device 100 acquires one kind of data to be notified to the application of the second device 200 from the memory 108 (Step S1702). Then, the processor 104 of the first device 100 generates a packet including the reference information of the characteristic for data communication (for example, an index such as the handle), the one kind of data acquired at Step S1702, and a piece of distinguishing information of the one kind of data (Step S1704). As described above, the packet is the Handle Value Indication message, for example. Next, the packet is transmitted to the second device 200 via the short-distance transmitter and receiver 102 (Step S1706). In the case of receiving the packet via the short-distance transmitter and receiver 204 (Step S1720), the processor 206 of the second device 200 analyses the packet. More specifically, based on the piece of distinguishing information included in the packet, the processor 206 of the second device 200 determines that the first device 100 notifies the one kind of data corresponding to the piece of distinguishing information to the second device 200. In the case of receiving the one kind of data successfully, the processor 206 generates the Handle Value Confirmation which is a response message to the Handle Value Indication message (Step S1722) and transmits the response message to the first device 100 via the short-distance transmitter and receiver 204 (Step S1724). In the case of receiving the response message within a predetermined period of time (for example, waiting time set to receive a response to the notification) via the short-distance transmitter and receiver 102 (Step S1708: Yes), the processor 104 of the first device 100 terminates the data notifying process shown in FIG. 17.

On the other hand, in the case that the first device 100 does not receive the response message from the second device 200 within the predetermined period of time or receives an error message (Step S1708: No), the first device 100 informs the user that notification of the one kind of data has failed (Step S1710) by displaying an error message on the display 114, for example. By this, the data notifying process ends. In this case, the process returns to Step S1706 and the first device 100 may transmit the Handle Value Indication message to the second device 200 again.

Second Embodiment

In a second embodiment, the first device 100 operates as a server, and an application of the device 200 operates as a client. Unlike the first embodiment, the service of the first device 100 which is the server contains only the characteristic for data communication. Further, in the present embodiment, the data writing and data notification described above are combined for data communication. Instead of not using the data request, i.e. not implementing the characteristic for data request in the server, the order of communication between the first device 100 (i.e. the server) and the application of the second device 200 (i.e. the client) is fixed. In the present embodiment, since the application of the second device 200 cannot request data from the first device 100, it needs to cache data received from the first device 100 by a Notification or Indication message.

Third Embodiment

Figure 18:
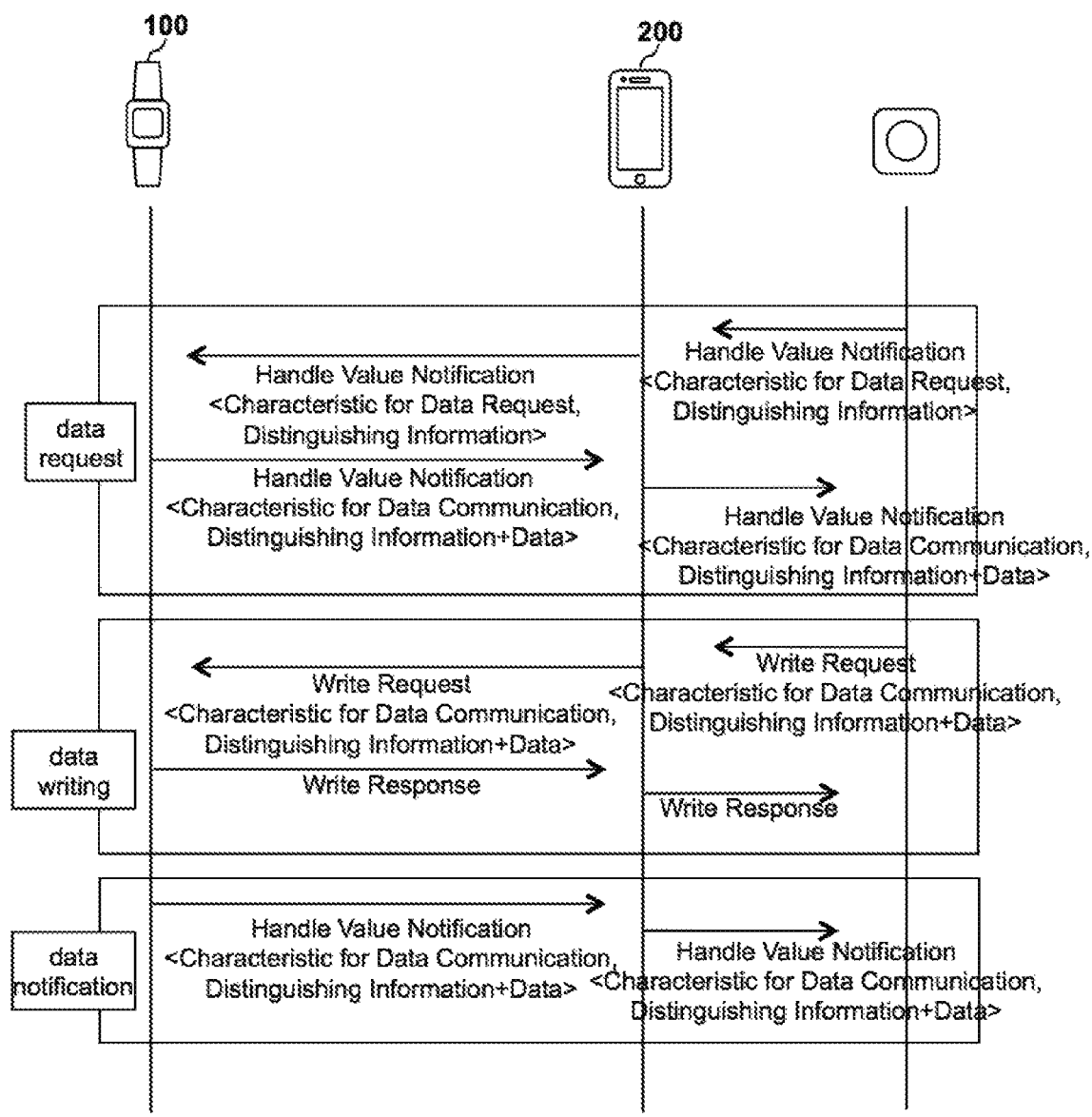
FIG. 18 shows a data communication method.

FIG. 18 shows a data communication method according to a third embodiment. In the present embodiment, each of the first device 100 and an application of the second device 200 operates as a server and a client, unlike the first embodiment. A characteristic for data communication is implemented in the first device 100 and a characteristic for data request is implemented in the application of the second device 200.

In the case that the application of the second device 200 requests one kind of data from the first device 100, it transmits to the first device 100 a Handle Value Notification message with the Attribute Handle parameter and the Attribute Value parameter set to the handle of the characteristic for data request and a piece of distinguishing information of the one kind of data to be requested, respectively, as shown in the drawing. In the case of receiving the Handle Value Notification message successfully, the first device 100 determines that the application of the second device 200 requests the one kind of data corresponding to the piece of distinguishing information. In the case that the request is valid, the first device 100 transmits to the application of the second device 200 a Handle Value Notification message with the Attribute Handle parameter and the Attribute Value parameter set to the handle of the characteristic for data communication and [the piece of distinguishing information+the one kind of data], respectively. By this, data request can be performed from the application of the second device 200 to the first device 100. Here, at least one of the Notification messages may be replaced by a Handle Value Indication message. In the case of receiving the Indication message successfully, the receiver of the message sends a Confirmation message to the sender.

In the case that the application of the second device 200 requests the first device to write one kind of data, it transmits to the first device 100 a Write Request message with the Attribute Handle parameter and the Attribute Value parameter set to the handle of the characteristic for data communication and [a piece of distinguishing information of the one kind of data+the one kind of data], respectively, as shown in the drawing. In the case of receiving the Write Request message, the first device 100 determines that the application of the second device 200 requests it to write the one kind of data in an attribute value corresponding to the piece of distinguishing information. In the case that the one kind of data is successfully written, the first device 100 sends a Write Response message to the application of the second device 200. Here, the Write Request message may be replaced by a Write Command message. In this case, the first device 100 sends no response message even in the case that the one kind of data is successfully written. Thus, it is possible to reduce power consumption of the first device 100. In the case that the importance of data is high, it is more desirable to use the Write Request message.

In the case that the first device 100 wants to notify the application of the second device 200 of one kind of data, it transmits to the application of the second device 200 a Handle Value Notification message with the Attribute Handle parameter and the Attribute Value parameter set to the handle of the characteristic for data communication and [a piece of distinguishing information of the one kind of data+the one kind of data], respectively, as shown in the drawing. Here, the Handle Value Notification message may be replaced by a Handle Value Indication message. In the case of receiving the Handle Value Indication message successfully, the receiver of the message sends a Handle Value Confirmation message to the sender.

Fourth Embodiment

Figure 19:
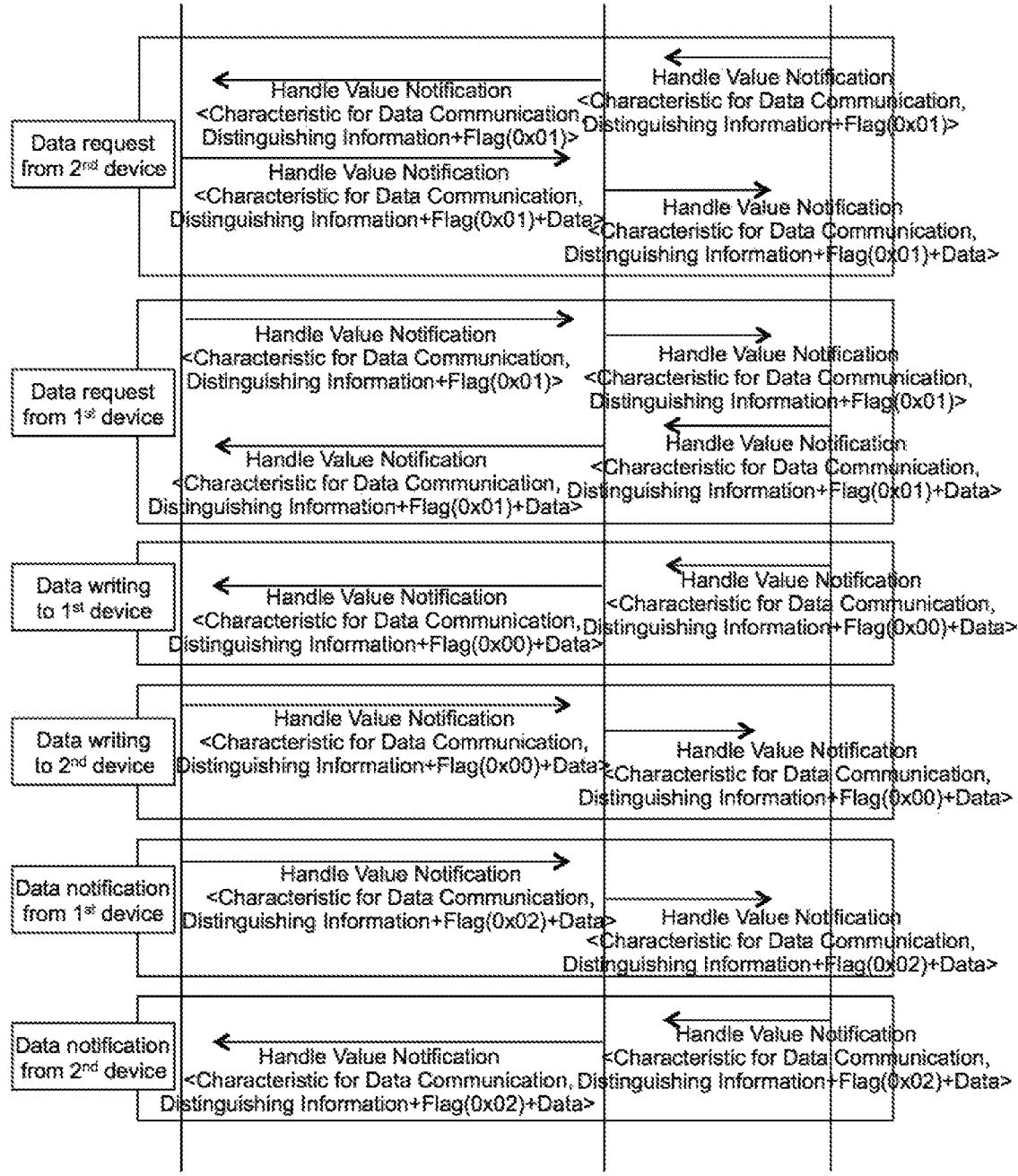
FIG. 19 shows a data communication method.

FIG. 19 shows a data communication method according to a fourth embodiment. In the present embodiment, each of the first device 100 and an application of the second device 200 operates as a server and a client, unlike the first embodiment. A characteristic for data communication is implemented in each of the first device 100 and the application of the second device 200.

Since only one type of characteristic is used in the present embodiment, the present embodiment further uses a flag to distinguish between the data request and the data communication. As will be described later, the flag is used to indicate (or determine) a use of a packet. In the embodiment shown in the drawing, a packet is interpreted to be for data writing in the case that the value of the flag included in the payload of the packet is 0x00. In the case that the value of the flag is 0x01, the packet is interpreted to be for data request. In the case that the value of the flag is 0x02, the packet is interpreted to be for data notification.

In the case that the application of the second device 200 requests one kind of data from the first device 100, the second device 200 generates a Handle Value Notification message with the Attribute Handle parameter and the Attribute Value parameter set to the handle of the characteristic for data communication implemented therein and [a piece of distinguishing information of the one kind of data to be requested+the flag 0x01], respectively, and transmits the message to the first device 100, as shown in the drawing. In the case of receiving the Handle Value Notification message successfully, the first device 100 analyses the received Handle Value Notification message. Since the value of the flag is set to 0x01, the first device 100 determines that the application of the second device 200 makes a request for the one kind of data corresponding to the piece of distinguishing information to the first device 100. In the case that the request is valid, the first device 100 transmits to the second device 200 a Handle Value Notification message with the Attribute Handle parameter and the Attribute Value parameter set to the handle of the characteristic for data communication implemented therein and [the piece of distinguishing information of the one kind of data+the flag 0x01+the one kind of data], respectively. By this, data request from the application of the second device 200 to the first device 100 can be performed. Here, at least one of the Notification messages can be replaced by a Handle Value Indication message. In the case of receiving the Indication message successfully, the receiver of the message sends a Confirmation message to the sender. Further, while the piece of distinguishing information, the flag, and the one kind of data are recorded in the data field of the packet in this order in the embodiment shown in the drawing, the order of recording may be changed in other embodiments.

In the case that the first device 100 requests one kind of data from the application of the second device 200, the first device 100 transmits to the application of the second device 200 a Handle Value Notification message with the Attribute Handle parameter and the Attribute Value parameter set to the handle of the characteristic for data communication implemented therein and [a piece of distinguishing information of the one kind of data to be requested+the flag 0x01], respectively, as shown in the drawing. In the case of receiving the Handle Value Notification message successfully, the application of the second device 200 analyses the received Handle Value Notification message. Since the value of the flag is set to 0x01, the second device 200 determines that the first device 100 makes a request for the one kind of data corresponding to the piece of distinguishing information to the application of the second device 200. In the case that the request is valid, the application of the second device 200 transmits to the first device 100 a Handle Value Notification message with the Attribute Handle parameter and the Attribute Value parameter set to the handle of the characteristic for data communication implemented therein and [the piece of distinguishing information of the one kind of data+the flag 0x01+the one kind of data], respectively. By this, data request from the first device 100 to the application of the second device 200 can be performed. Here, at least one of the Notification messages can be replaced by a Handle Value Indication message. In the case of receiving the Indication message successfully, the receiver of the message sends a Confirmation message to the sender. Further, while the piece of distinguishing information, the flag, and the one kind of data are recorded in the data field of the packet in this order in the embodiment shown in the drawing, the order of recording may be changed in other embodiments.

In the case that the application of the second device 200 wants to request the first device 100 to write one kind of data, the second device 200 transmits to the first device 100 a Handle Value Notification message with the Attribute Handle parameter and the Attribute Value parameter set to the handle of the characteristic for data communication implemented therein and [a piece of distinguishing information of the one kind of data to be written+the flag 0x00+the one kind of data], respectively, as shown in the drawing. In the case of receiving the Handle Value Notification message successfully, the first device 100 analyses the received Handle Value Notification message. Since the value of the flag is set to 0x00, the first device 100 determines that the application of the second device 200 requests the first device 100 to write the one kind of data in an attribute value corresponding to the piece of distinguishing information. Further, while the piece of distinguishing information, the flag, and the one kind of data are recorded in the data field of the packet in this order in the embodiment shown in the drawing, the order of recording may be changed in other embodiments. In addition, the Handle Value Notification message can be replaced by a Handle Value Indication message.

In the case that the first device 100 wants to request the application of the second device 200 to write one kind of data, the first device 100 transmits to the application of the second device 200 a Handle Value Notification message with the Attribute Handle parameter and the Attribute Value parameter set to the handle of the characteristic for data communication implemented therein and [a piece of distinguishing information of the one kind of data to be written+the flag 0x00+the one kind of data], respectively, as shown in the drawing. In the case of receiving the Handle Value Notification message successfully, the application of the second device 200 analyses the received Handle Value Notification message. Since the value of the flag is set to 0x00, the application of the second device 200 determines that the first device 100 requests the application of the second device 200 to write the one kind of data in an attribute value corresponding to the piece of distinguishing information. Further, while the piece of distinguishing information, the flag, and the one kind of data are recorded in the data field of the packet in this order in the embodiment shown in the drawing, the order of recording may be changed in other embodiments. In addition, the Handle Value Notification message can be replaced by a Handle Value Indication message.

In the case that the first device 100 notifies the application of the second device 200 of one kind of data, the first device 100 transmits to the application of the second device 200 a Handle Value Notification message with the Attribute Handle parameter and the Attribute Value parameter set to the handle of the characteristic for data communication and [a piece of distinguishing information of the one kind of data to be notified+the flag 0x02+the one kind of data], respectively, as shown in the drawing. Here, the Handle Value Notification message can be replaced by a Handle Value Indication message. In the case of receiving the Handle Value Indication message successfully, the receiver of the message sends a Handle Value Confirmation message to the sender.

In the case that the application of the second device 200 notifies the first device 100 of one kind of data, the second device 200 transmits to the first device 100 a Handle Value Notification message with the Attribute Handle parameter and the Attribute Value parameter set to the handle of the characteristic for data communication and [a piece of distinguishing information of the one kind of data to be notified+the flag 0x02+the one kind of data], respectively, as shown in the drawing. Here, the Handle Value Notification message can be replaced by a Handle Value Indication message.

Fifth Embodiment

Figure 20:
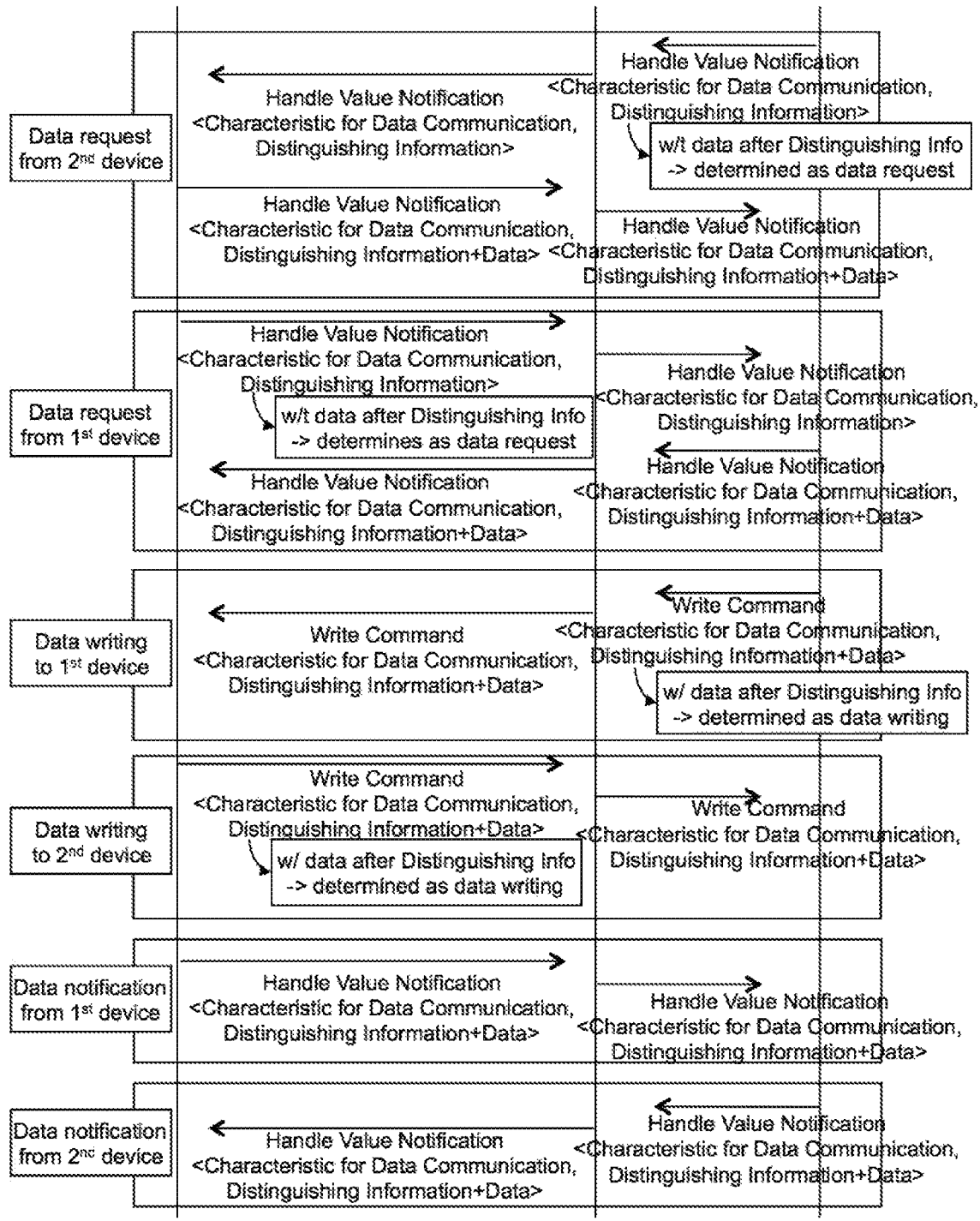
FIG. 20 shows a data communication method.

FIG. 20 shows a data communication method according to a fifth embodiment. In the present embodiment, each of the first device 100 and an application of the second device 200 operates as a server and a client and a characteristic for data communication is implemented in each of the first device 100 and the application of the second device 200, similarly to the fourth embodiment. Unlike the fourth embodiment using the flags, the data request and the data communication are distinguished according to whether or not valid data exists without using the flags in the present embodiment.

In the case that the application of the second device 200 requests one kind of data from the first device 100, the second device 200 transmits to the first device 100 a Handle Value Notification message with the Attribute Handle parameter and the Attribute Value parameter set to the handle of the characteristic for data communication and a piece of distinguishing information of the one kind of data to be requested, respectively, as shown in the drawing. In the case of receiving the Handle Value Notification message successfully, the first device 100 analyses the received Handle Value Notification message. In the case that no valid data as a setting value corresponding to the piece of distinguishing information is extracted after the piece of distinguishing information in the data field of the payload of the message, the first device 100 determines that the application of the second device 200 makes a request for the one kind of data corresponding to the piece of distinguishing information to the first device 100. In the case that the request is valid, the first device 100 transmits to the application of the second device 200 a Handle Value Notification message with the Attribute Handle parameter and the Attribute Value parameter set to the handle of the characteristic for data communication and [the piece of distinguishing information of the one kind of data+the one kind of data], respectively. By this, data request can be performed from the application of the second device 200 to the first device 100. Here, at least one of the Notification messages may be replaced by a Handle Value Indication message.

In the case that the first device 100 requests one kind of data from the application of the second device 200, the first device 100 transmits to application of the second device 200 a Handle Value Notification message with the Attribute Handle parameter and the Attribute Value parameter set to the handle of the characteristic for data communication and a piece of distinguishing information of the one kind of data to be requested, respectively, as shown in the drawing. In the case of receiving the Handle Value Notification message successfully, the application of the second device 200 analyses the received Handle Value Notification message. In the case that no valid data as a setting value corresponding to the piece of distinguishing information is extracted after the piece of distinguishing information in the data field of the payload of the message, the second device 200 determines that the first device 100 makes a request for the one kind of data corresponding to the piece of distinguishing information to the application of the second device 200. In the case that the request is valid, the application of the second device 200 transmits to the first device 100 a Handle Value Notification message with the Attribute Handle parameter and the Attribute Value parameter set to the handle of the characteristic for data communication and [the piece of distinguishing information of the one kind of data+the one kind of data], respectively. By this, data request can be performed from the first device 100 to the application of the second device 200. Here, at least one of the Notification messages may be replaced by a Handle Value Indication message.

In the case that the application of the second device 200 wants to request the first device 100 to write one kind of data, the second device 200 transmits to the first device 100 a Write Command message with the Attribute Handle parameter and the Attribute Value parameter set to the handle of the characteristic for data communication and [a piece of distinguishing information of the one kind of data to be written+the one kind of data], respectively, as shown in the drawing. In the case of receiving the Write Command message, the first device 100 analyses the received Write Command message. In the case that valid data as a setting value corresponding to the piece of distinguishing information is extracted after the piece of distinguishing information in the data field of the payload of the message, the first device 100 determines that the application of the second device 200 requests the first device 100 to write the one kind of data in an attribute value corresponding to the piece of distinguishing information. Here, the Write Command message can be replaced by a Write Request message.

In the case that the first device 100 wants to request the application of the second device 200 to write one kind of data, the first device 100 transmits to the application of the second device 200 a Write Command message with the Attribute Handle parameter and the Attribute Value parameter set to the handle of the characteristic for data communication and [a piece of distinguishing information of the one kind of data to be written+the one kind of data], respectively, as shown in the drawing. In the case of receiving the Write Command message, the application of the second device 200 analyses the received Write Command message. In the case that valid data as a setting value corresponding to the piece of distinguishing information is extracted after the piece of distinguishing information in the data field of the payload of the message, the second device 200 determines that the first device 100 requests the application of the second device 200 to write the one kind of data in an attribute value corresponding to the piece of distinguishing information. Here, the Write Command message can be replaced by a Write Request message.

In the case that the first device 100 notifies the application of the second device 200 of one kind of data, the first device 100 transmits to the application of the second device 200 a Handle Value Notification message with the Attribute Handle parameter and the Attribute Value parameter set to the handle of the characteristic for data communication and [a piece of distinguishing information of the one kind of data to be notified+the one kind of data], respectively, as shown in the drawing. Here, the Handle Value Notification message can be replaced by a Handle Value Indication message.

In the case that the application of the second device 200 notifies the first device 100 of one kind of data, the second device 200 transmits to the first device 100 a Handle Value Notification message with the Attribute Handle parameter and the Attribute Value parameter set to the handle of the characteristic for data communication and [a piece of distinguishing information of the one kind of data to be notified+the one kind of data], respectively, as shown in the drawing. Here, the Handle Value Notification message can be replaced by a Handle Value Indication message.

Sixth Embodiment

Figure 21:
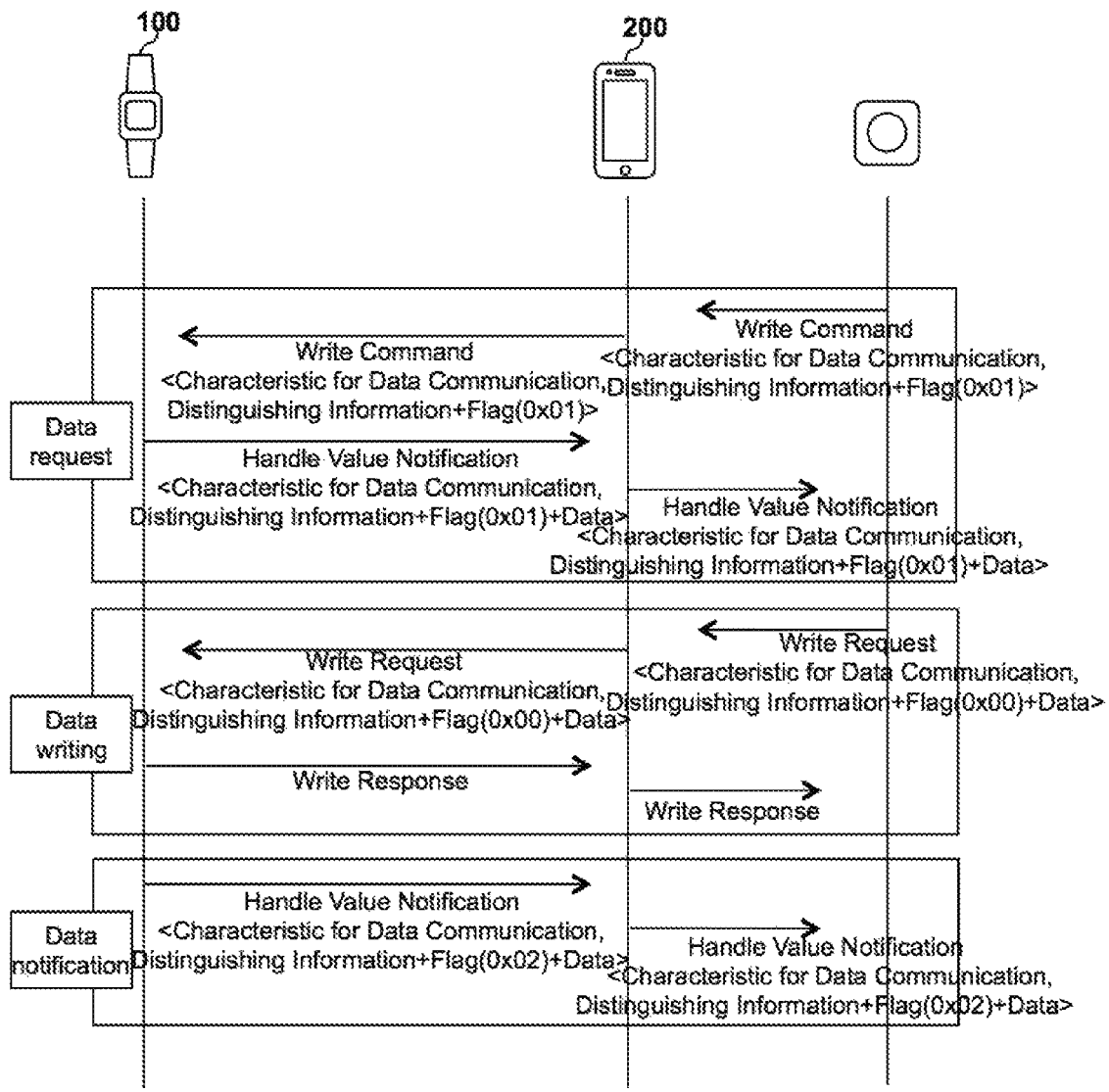
FIG. 21 shows a data communication method.

FIG. 21 shows a data communication method according to a sixth embodiment. In the present embodiment, the first device 100 operates as a server and an application of the second device 200 operates as a client. Similarly to the second embodiment, only a characteristic for data communication is implemented in the server. Further, similarly to the fourth embodiment, flags for distinguishing between the data request and the data communication is used in the present embodiment.

In the case that the application of the second device 200 requests one kind of data from the first device 100, the second device 200 transmits to the first device 100 a Write Command message with the Attribute Handle parameter and the Attribute Value parameter set to the handle of the characteristic for data communication of the first device 100 and [a piece of distinguishing information of the one kind of data to be requested+the flag 0x01], respectively, as shown in the drawing. While the piece of distinguishing information and the flag are recorded in this order in the present embodiment, the order of recording may be changed (i.e. the piece of distinguishing information may be recorded after the flag) in other embodiments. In the case that the first device 100 receives the Write Command message successfully and the value of the flag included in the message is 0x01, the first device 100 determines that the application of the second device 200 makes a request for the one kind of data corresponding to the piece of distinguishing information to the first device 100. In the case that the request is valid, the first device 100 transmits to the second device 200 a Handle Value Notification message with the Attribute Handle parameter and the Attribute Value parameter set to the handle of the characteristic for data communication and [the piece of distinguishing information of the one kind of data+the flag 0x01+the one kind of data], respectively. While the piece of distinguishing information, the flag, and the one kind of data are recorded in this order in the present embodiment, the order of recording may be changed in other embodiments. By this, data request from the application of the second device 200 to the first device 100 can be performed. Here, at least one of the Notification messages can be replaced by a Handle Value Indication message.

In the case that the application of the second device 200 wants to request the first device 100 to write one kind of data, the second device 200 transmits to the first device 100 a Write Request message with the Attribute Handle parameter and the Attribute Value parameter set to the handle of the characteristic for data communication and [a piece of distinguishing information of the one kind of data to be written+the flag 0x00+the one kind of data], respectively, as shown in the drawing. While the piece of distinguishing information, the flag, and the one kind of data are recorded in this order in the present embodiment, the order of recording may be changed in other embodiments. In the case that the first device 100 receives the Write Request message successfully and the value of the flag included in the message is 0x00, the first device 100 determines that the application of the second device 200 requests the first device 100 to write the one kind of data in an attribute value corresponding to the piece of distinguishing information. In the case that the one kind of data is successfully written, the first device 100 sends a Write response message to the application of the second device 200. In the case that the importance of the data is not high or the power consumption of the first device 100 should be reduced, the application of the second device 200 can transmit a Write Command message which is not accompanied by a response message.

In the case that the first device 100 notifies the application of the second device 200 of one kind of data, the first device 100 transmits to the application of the second device 200 a Handle Value Notification message with the Attribute Handle parameter and the Attribute Value parameter set to the handle of the characteristic for data communication and [a piece of distinguishing information of the one kind of data to be notified+the flag 0x02+the one kind of data], respectively, as shown in the drawing. Here, the Handle Value Notification message can be replaced by a Handle Value Indication message. In the case of receiving the Handle Value Indication message successfully, the application of the second device 200 sends a Handle Value Confirmation message to the first device 100.

Seventh Embodiment

Figure 22:
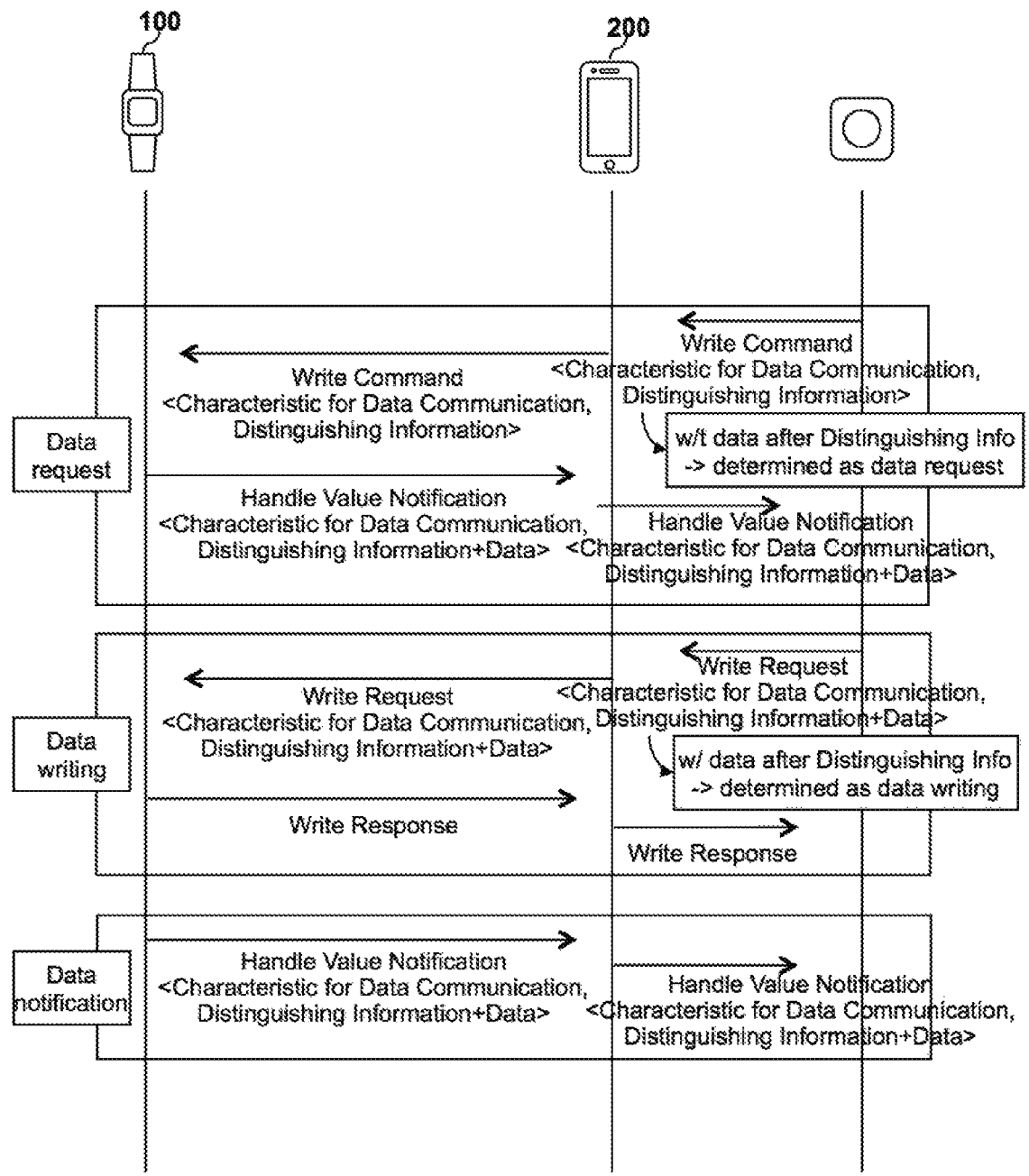
FIG. 22 shows a data communication method.

FIG. 22 shows a data communication method according to a seventh embodiment. In the present embodiment, the first device 100 operates as a server and an application of the second device 200 operates as a client. Similarly to the second embodiment, only a characteristic for data communication is implemented in the server. Further, similarly to the fifth embodiment, the data request and the data communication are distinguished according to whether or not valid data exists.

In the case that the application of the second device 200 requests one kind of data from the first device 100, the second device 200 transmits to the first device 100 a Write Command message with the Attribute Handle parameter and the Attribute Value parameter set to the handle of the characteristic for data communication and a piece of distinguishing information of the one kind of data to be requested, respectively, as shown in the drawing. In the case of receiving the Write Command message successfully, the first device 100 analyses the received message. In the case that no valid data as a setting value corresponding to the piece of distinguishing information is extracted after the piece of distinguishing information in the data field of the payload of the message, the first device 100 determines that the application of the second device 200 makes a request for the one kind of data corresponding to the piece of distinguishing information to the first device 100. In the case that the request is valid, the first device 100 transmits to the application of the second device 200 a Handle Value Notification message with the Attribute Handle parameter and the Attribute Value parameter set to the handle of the characteristic for data communication and [the piece of distinguishing information of the one kind of data+the one kind of data], respectively. By this, data request can be performed from the application of the second device 200 to the first device 100. Here, the Handle Value Notification messages may be replaced by a Handle Value Indication message.

In the case that the application of the second device 200 wants to request the first device 100 to write one kind of data, the second device 200 transmits to the first device 100 a Write Request message with the Attribute Handle parameter and the Attribute Value parameter set to the handle of the characteristic for data communication and [a piece of distinguishing information of the one kind of data to be written+the one kind of data], respectively, as shown in the drawing. In the case of receiving the Write Request message, the first device 100 analyses the received message. In the case that valid data as a setting value corresponding to the piece of distinguishing information is extracted after the piece of distinguishing information in the data field of the payload of the message, the first device 100 determines that the application of the second device 200 requests the first device 100 to write the one kind of data in an attribute value corresponding to the piece of distinguishing information. In the case that the one kind of data is successfully written, the first device 100 sends a Write Response message to the application of the second device 200. Here, the Write Request message can be replaced by a Write Command message.

In the case that the first device 100 notifies the application of the second device 200 of one kind of data, the first device 100 transmits to the application of the second device 200 a Handle Value Notification message with the Attribute Handle parameter and the Attribute Value parameter set to the handle of the characteristic for data communication and [a piece of distinguishing information of the one kind of data to be notified+the data], respectively, as shown in the drawing. Here, the Handle Value Notification message can be replaced by a Handle Value Indication message.

FIG. 23 is a table summarizing the configurations and features of the embodiments of the present invention. As can be seen from this table, the number and type of characteristics implemented in the first device/the second device and/or the method for distinguishing the messages are different according to the embodiments. Each of the first embodiment and the third to seventh embodiments has a high degree of freedom in the communication order because the data request can be performed as needed in these embodiments. In the second embodiment, a service contains one characteristic. In the third to fifth embodiments, the service discovery is performed mutually between the first device and the second device.

The present invention has been described with respect to specific embodiments in which it has been applied to Bluetooth, in particular BLE, but its application field is not limited to Bluetooth. For example, the invention can be applied to different wireless communication technologies. In particular, the present invention is applicable to wireless communication technologies which utilize the concept of services and characteristics.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. These modifications and embodiments fall within the scope and the spirit of the invention described in this specification and within the scope of the invention as defined in the appended claims and equivalents thereof.

What is claimed is:

1. A device for wireless communication with an other device comprising:
   a transmitter and receiver that transmits and receives communication packets to and from the other device; and
   a processor,
   wherein the processor generates an integrated-type characteristic packet which corresponds to a predetermined service in the other device, wherein the predetermined service is defined by making a single integrated-type characteristic correspond to a plurality of kinds of data and each kind of data is associated with one of a plurality of functions of the other device, wherein the integrated-type characteristic packet includes an index information of the integrated-type characteristic, a data relating to one of the plurality of predetermined functions of the other device, a distinguishing information for distinguishing the one function, and a flag for indicating a use of the integrated-type characteristic packet, and wherein the plurality of kinds of data are handled by the one integrated-type characteristic used for data communication and only one of the index information is given to the plurality of kinds of data.

2. The device of claim 1, further comprising:
a memory that stores the index information, the data, and the distinguishing information.

3. The device of claim 1, wherein the distinguishing information is stored in a payload of the integrated-type characteristic packet.

4. An electronic timepiece comprising:
a device of claim 1;
a clock circuit that counts current time; and
a display that displays the current time counted by the clock circuit.

5. A communication method performed by a device comprising:
acquiring a predetermined data to be transmitted to an other device;
generating an integrated-type characteristic packet which corresponds to a predetermined service in the other device, wherein the predetermined service is defined by making a single integrated-type characteristic correspond to a plurality of kinds of data and each kind of data is associated with one of a plurality of functions of the other device; and
transmitting the integrated-type characteristic packet to the other device,
wherein the integrated-type characteristic packet includes an index information of the integrated-type characteristic, a data relating to one of the plurality of predetermined functions of the other device, a distinguishing information for distinguishing the one function, and a flag for indicating a use of the integrated-type characteristic packet, and
wherein the plurality of kinds of data are handled by the one integrated-type characteristic used for data communication and only one of the index information is (liven to the plurality of kinds of data.

6. A non-transitory computer-readable storage medium for storing a computer program comprising a sequence of instructions which, when executed by a computer included in a device, cause the device to perform steps of:
acquiring a predetermined data to be transmitted to other device;
generating an integrated-type characteristic packet which corresponds to a predetermined service in the other device, wherein the predetermined service is defined by making a single integrated-type characteristic correspond to a plurality of kinds of data and each kind of data is associated with one of a plurality of functions of the other device; and
transmitting the integrated-type characteristic packet to the other device,
wherein the integrated-type characteristic packet includes an index information of the integrated-type characteristic, a data relating to one of the plurality of predetermined functions of the other device, a distinguishing information for distinguishing the one function, and a flag for indicating a use of the integrated-type characteristic packet, and
wherein the plurality of kinds of data are handled by the one integrated-type characteristic used for data communication and only one of the index information is given to the plurality of kinds of data.

7. The device of claim 1,
wherein the integrated-type characteristic that is a data array used in the predetermined service, and wherein the service is any entity that can provide information, perform an action, or control a resource on behalf of another entity.

8. The communication method of claim 5,
wherein the integrated-type characteristic that is a data array used in the predetermined service, and wherein the service is any entity that can provide information, perform an action, or control a resource on behalf of another entity.

9. The non-transitory computer-readable storage medium of claim 6,
wherein the integrated-type characteristic that is a data array used in the predetermined service, and wherein the service is any entity that can provide information, perform an action, or control a resource on behalf of another entity.

* * * * *

UNITED STATES PATENT AND TRADEMARK OFFICE
CERTIFICATE OF CORRECTION

PATENT NO. : 10,686,915 B2
APPLICATION NO. : 15/912758
DATED : June 16, 2020
INVENTOR(S) : Kyou Page 1 of 1

It is certified that error appears in the above-identified patent and that said Letters Patent is hereby corrected as shown below:

In the Claims

Column 27, Lines 25-48, It should read:
5. A communication method performed by a device comprising:
    acquiring a predetermined data to be transmitted to an other device;
    generating an integrated-type characteristic packet which corresponds to a predetermined service in the other device, wherein the predetermined service is defined by making a single integrated-type characteristic correspond to a plurality of kinds of data and each kind of data is associated with one of a plurality of functions of the other device; and
    transmitting the integrated-type characteristic packet to the other device,
    wherein the integrated-type characteristic packet includes an index information of the integrated-type characteristic, a data relating to one of the plurality of predetermined functions of the other device, a distinguishing information for distinguishing the one function, and a flag for indicating a use of the integrated-type characteristic packet, and
    wherein the plurality of kinds of data are handled by the one integrated-type characteristic used for data communication and only one of the index information is given to the plurality of kinds of data.

Signed and Sealed this
Fourth Day of August, 2020

Andrei Iancu
*Director of the United States Patent and Trademark Office*